United States Patent [19]
Van Hook et al.

[11] Patent Number: 5,812,147
[45] Date of Patent: Sep. 22, 1998

[54] INSTRUCTION METHODS FOR PERFORMING DATA FORMATTING WHILE MOVING DATA BETWEEN MEMORY AND A VECTOR REGISTER FILE

[75] Inventors: Timothy J. Van Hook, Atherton; Henry P. Moreton, Oakland; Michael L. Fuccio, Sunnyvale; Robert W. Pryor, Jr., Fremont; Charles F. Tuffli, III, Cupertino, all of Calif.

[73] Assignee: Silicon Graphics, Inc., Mountain View, Calif.

[21] Appl. No.: 716,972

[22] Filed: Sep. 20, 1996

[51] Int. Cl.⁶ .................................................. G06F 13/00
[52] U.S. Cl. ............................................. 345/511; 345/513
[58] Field of Search ..................................... 345/511, 513, 345/508, 515; 711/201; 395/566, 380, 898

[56] References Cited

PUBLICATIONS

Microprocessor Report, "UltraSpare Adds Multimedia Instruction" by Linley Gwennap, Dec. 5, 1994.
Motorola, MC88110—Second Generation RISC Microprocessor User's Manual; Sections 1 and 5; pp. 10–47 to 10–49, 10–76 to 10–78, 10–90 and 10–91, 1991.

*Primary Examiner*—Kee M. Tung
*Attorney, Agent, or Firm*—Wagner, Murabito & Hao

[57] ABSTRACT

Instruction methods for moving data between memory and a vector register file while performing data formatting. The methods are processed by a processor having a vector register file and a memory unit. The methods are useful in the graphics art because they allow more efficient movement and processing of raster formatted graphics data. The vector register file has a number of vector registers (e.g., 32) that each contain multi-bits of storage (e.g., 128 bits). In one class of instructions, eight byte locations within memory are simultaneously loaded into eight separate 16 bit locations within a register of the register file. The data can be integer or fraction and signed or unsigned. The data can also be stored from the register file back to memory. In a second class of instructions, alternate locations of a memory qaudword are selected and simultaneously loaded in the register file. In a third class, data is obtained across a word boundary by a first instruction that obtains a first part and a second instruction that obtains the remainder part crossing the boundary. In a last class of instruction transfers, a block (e.g., 8 16-bit×8 16-bit) of data is loaded from memory, stored in the register file and stored back into memory causing a transposition of the data block (16 cycles). A block (e.g., 8 16-bit×8 16-bit) of data is stored from the register file to memory, and loaded back into the register file causing a transposition of the data block (16 cycles).

26 Claims, 23 Drawing Sheets

|   |   |   |   |
|---|---|---|---|
| a | b | c | d |
| e | f | g | h |
| i | j | k | l |
| m | n | o | p |

|   |   |   |   |
|---|---|---|---|
| a | e | i | m |
| b | f | j | n |
| c | g | k | o |
| d | h | l | p |

```
vd> pSx VICEMSP_DRAM:64                                              401
V + 8000      0:0000    1:0010    2:0020    3:0030    4:0040    5:0050    6:0060    7:0070
V + 8010      8:1000    9:1010    a:1020    b:1030    c:1040    d:1050    e:1060    f:1070
V + 8020     10:2000   11:2010   12:2020   13:2030   14:2040   15:2050   16:2060   17:2070
V + 8030     18:3000   19:3010   1a:3020   1b:3030   1c:3040   1d:3050   1e:3060   1f:3070
V + 8040     20:4000   21:4010   22:4020   23:4030   24:4040   25:4050   26:4060   27:4070
V + 8050     28:5000   29:5010   2a:5020   2b:5030   2c:5040   2d:5050   2e:5060   2f:5070
V + 8060     30:6000   31:6010   32:6020   33:6030   34:6040   35:6050   36:6060   37:6070
V + 8070     38:7000   39:7010   3a:7020   3b:7030   3c:7040   3d:7050   3e:7060   3f:7070
```

FIG. 6D

```
vd> pSx $v8:64                                                       204
      0:0000    1:0000    2:0000    3:0000    4:0000    5:0000    6:0000    7:0000 — 8
      8:0000    9:0010    a:0000    b:0000    c:0000    d:0000    e:0000    f:0000 — 9
     10:0000   11:0000   12:0020   13:0000   14:0000   15:0000   16:0000   17:0000 — 10
     18:0000   19:0000   1a:0000   1b:0030   1c:0000   1d:0000   1e:0000   1f:0000 — 11
     20:0000   21:0000   22:0000   23:0000   24:0040   25:0000   26:0000   27:0000 — 12
     28:0000   29:0000   2a:0000   2b:0000   2c:0000   2d:0050   2e:0000   2f:0000 — 13
     30:0000   31:0000   32:0000   33:0000   34:0000   35:0000   36:0060   37:0000 — 14
     38:0000   39:0000   3a:0000   3b:0000   3c:0000   3d:0000   3e:0000   3f:0070 — 15
       50        51        52        53        54        55        56        57
```

FIG. 7A

```
vd> pSx $v8:64                                                       204
      0:0000    1:1000    2:0000    3:0000    4:0000    5:0000    6:0000    7:0000 — 8
      8:0000    9:0010    a:1010    b:0000    c:0000    d:0000    e:0000    f:0000 — 9
     10:0000   11:0000   12:0020   13:1020   14:0000   15:0000   16:0000   17:0000 — 10
     18:0000   19:0000   1a:0000   1b:0030   1c:1030   1d:0000   1e:0000   1f:0000 — 11
     20:0000   21:0000   22:0000   23:0000   24:0040   25:1040   26:0000   27:0000 — 12
     28:0000   29:0000   2a:0000   2b:0000   2c:0000   2d:0050   2e:1050   2f:0000 — 13
     30:0000   31:0000   32:0000   33:0000   34:0000   35:0000   36:0060   37:1060 — 14
     38:1070   39:0000   3a:0000   3b:0000   3c:0000   3d:0000   3e:0000   3f:0070 — 15
       50        51        52        53        54        55        56        57
```

FIG. 7B

```
vd> pSx $v8:64                                                       204
      0:0000    1:1000    2:2000    3:0000    4:0000    5:0000    6:0000    7:0000 — 8
      8:0000    9:0010    a:1010    b:2010    c:0000    d:0000    e:0000    f:0000 — 9
     10:0000   11:0000   12:0020   13:1020   14:2020   15:0000   16:0000   17:0000 — 10
     18:0000   19:0000   1a:0000   1b:0030   1c:1030   1d:2030   1e:0000   1f:0000 — 11
     20:0000   21:0000   22:0000   23:0000   24:0040   25:1040   26:2040   27:0000 — 12
     28:0000   29:0000   2a:0000   2b:0000   2c:0000   2d:0050   2e:1050   2f:2050 — 13
     30:2060   31:0000   32:0000   33:0000   34:0000   35:0000   36:0060   37:1060 — 14
     38:1070   39:2070   3a:0000   3b:0000   3c:0000   3d:0000   3e:0000   3f:0070 — 15
       50        51        52        53        54        55        56        57
```

FIG. 7C vd> pSx $v8:64                                                   204

| | | | | | | | | |
|---|---|---|---|---|---|---|---|---|
| 0:0000 | 1:1000 | 2:2000 | 3:3000 | 4:0000 | 5:0000 | 6:0000 | 7:0000 | ~8 |
| 8:0000 | 9:0010 | a:1010 | b:2010 | c:3010 | d:0000 | e:0000 | f:0000 | ~9 |
| 10:0000 | 11:0000 | 12:0020 | 13:1020 | 14:2020 | 15:3020 | 16:0000 | 17:0000 | ~10 |
| 18:0000 | 19:0000 | 1a:0000 | 1b:0030 | 1c:1030 | 1d:2030 | 1e:3030 | 1f:0000 | ~11 |
| 20:0000 | 21:0000 | 22:0000 | 23:0000 | 24:0040 | 25:1040 | 26:2040 | 27:3040 | ~12 |
| 28:3050 | 29:0000 | 2a:0000 | 2b:0000 | 2c:0000 | 2d:0050 | 2e:1050 | 2f:2050 | ~13 |
| 30:2060 | 31:3060 | 32:0000 | 33:0000 | 34:0000 | 35:0000 | 36:0060 | 37:1060 | ~14 |
| 38:1070 | 39:2070 | 3a:3070 | 3b:0000 | 3c:0000 | 3d:0000 | 3e:0000 | 3f:0070 | ~15 |
| 50 | 51 | 52 | 53 | 54 | 55 | 56 | 57 | |

FIG. 7D vd> pSx $v8:64                                                   204

| | | | | | | | | |
|---|---|---|---|---|---|---|---|---|
| 0:0000 | 1:1000 | 2:2000 | 3:3000 | 4:4000 | 5:0000 | 6:0000 | 7:0000 | ~8 |
| 8:0000 | 9:0010 | a:1010 | b:2010 | c:3010 | d:4010 | e:0000 | f:0000 | ~9 |
| 10:0000 | 11:0000 | 12:0020 | 13:1020 | 14:2020 | 15:3020 | 16:4020 | 17:0000 | ~10 |
| 18:0000 | 19:0000 | 1a:0000 | 1b:0030 | 1c:1030 | 1d:2030 | 1e:3030 | 1f:4030 | ~11 |
| 20:4040 | 21:0000 | 22:0000 | 23:0000 | 24:0040 | 25:1040 | 26:2040 | 27:3040 | ~12 |
| 28:3050 | 29:4050 | 2a:0000 | 2b:0000 | 2c:0000 | 2d:0050 | 2e:1050 | 2f:2050 | ~13 |
| 30:2060 | 31:3060 | 32:4060 | 33:0000 | 34:0000 | 35:0000 | 36:0060 | 37:1060 | ~14 |
| 38:1070 | 39:2070 | 3a:3070 | 3b:4070 | 3c:0000 | 3d:0000 | 3e:0000 | 3f:0070 | ~15 |
| 50 | 51 | 52 | 53 | 54 | 55 | 56 | 57 | |

FIG. 7E vd> pSx $v8:64                                                   204

| | | | | | | | | |
|---|---|---|---|---|---|---|---|---|
| 0:0000 | 1:1000 | 2:2000 | 3:3000 | 4:4000 | 5:5000 | 6:0000 | 7:0000 | ~8 |
| 8:0000 | 9:0010 | a:1010 | b:2010 | c:3010 | d:4010 | e:5010 | f:0000 | ~9 |
| 10:0000 | 11:0000 | 12:0020 | 13:1020 | 14:2020 | 15:3020 | 16:4020 | 17:5020 | ~10 |
| 18:5030 | 19:0000 | 1a:0000 | 1b:0030 | 1c:1030 | 1d:2030 | 1e:3030 | 1f:4030 | ~11 |
| 20:4040 | 21:5040 | 22:0000 | 23:0000 | 24:0040 | 25:1040 | 26:2040 | 27:3040 | ~12 |
| 28:3050 | 29:4050 | 2a:5050 | 2b:0000 | 2c:0000 | 2d:0050 | 2e:1050 | 2f:2050 | ~13 |
| 30:2060 | 31:3060 | 32:4060 | 33:5060 | 34:0000 | 35:0000 | 36:0060 | 37:1060 | ~14 |
| 38:1070 | 39:2070 | 3a:3070 | 3b:4070 | 3c:5070 | 3d:0000 | 3e:0000 | 3f:0070 | ~15 |
| 50 | 51 | 52 | 53 | 54 | 55 | 56 | 57 | |

FIG. 7F vd> pSx $v8:64                                                   204

| | | | | | | | | |
|---|---|---|---|---|---|---|---|---|
| 0:0000 | 1:1000 | 2:2000 | 3:3000 | 4:4000 | 5:5000 | 6:6000 | 7:0000 | ~8 |
| 8:0000 | 9:0010 | a:1010 | b:2010 | c:3010 | d:4010 | e:5010 | f:6010 | ~9 |
| 10:6020 | 11:0000 | 12:0020 | 13:1020 | 14:2020 | 15:3020 | 16:4020 | 17:5020 | ~10 |
| 18:5030 | 19:6030 | 1a:0000 | 1b:0030 | 1c:1030 | 1d:2030 | 1e:3030 | 1f:4030 | ~11 |
| 20:4040 | 21:5040 | 22:6040 | 23:0000 | 24:0040 | 25:1040 | 26:2040 | 27:3040 | ~12 |
| 28:3050 | 29:4050 | 2a:5050 | 2b:6050 | 2c:0000 | 2d:0050 | 2e:1050 | 2f:2050 | ~13 |
| 30:2060 | 31:3060 | 32:4060 | 33:5060 | 34:6060 | 35:0000 | 36:0060 | 37:1060 | ~14 |
| 38:1070 | 39:2070 | 3a:3070 | 3b:4070 | 3c:5070 | 3d:6070 | 3e:0000 | 3f:0070 | ~15 |
| 50 | 51 | 52 | 53 | 54 | 55 | 56 | 57 | |

FIG. 7G

```
vd> pSx $v8:64                                              204
        0:0000    1:1000    2:2000    3:3000    4:4000    5:5000    6:6000    7:7000 ~ 8
        8:7010    9:0010    a:1010    b:2010    c:3010    d:4010    e:5010    f:6010 ~ 9
       10:6020   11:7020   12:0020   13:1020   14:2020   15:3020   16:4020   17:5020 ~ 10
       18:5030   19:6030   1a:7030   1b:0030   1c:1030   1d:2030   1e:3030   1f:4030 ~ 11
       20:4040   21:5040   22:6040   23:7040   24:0040   25:1040   26:2040   27:3040 ~ 12
       28:3050   29:4050   2a:5050   2b:6050   2c:7050   2d:0050   2e:1050   2f:2050 ~ 13
       30:2060   31:3060   32:4060   33:5060   34:6060   35:7060   36:0060   37:1060 ~ 14
       38:1070   39:2070   3a:3070   3b:4070   3c:5070   3d:6070   3e:7070   3f:0070 ~ 15
         50        51        52        53        54        55        56        57
```

FIG. 7H

```
vd> pSx VICEMSP_DRAM:64                                                    401'
V + 8000    0:0000     1:1000     2:2000     3:3000     4:4000     5:5000     6:6000     7:7000
V + 8010    8:1000     9:1010     a:1020     b:1030     c:1040     d:1050     e:1060     f:1070
V + 8020    10:2000    11:2010    12:2020    13:2030    14:2040    15:2050    16:2060    17:2070
V + 8030    18:3000    19:3010    1a:3020    1b:3030    1c:3040    1d:3050    1e:3060    1f:3070
V + 8040    20:4000    21:4010    22:4020    23:4030    24:4040    25:4050    26:4060    27:4070
V + 8050    28:5000    29:5010    2a:5020    2b:5030    2c:5040    2d:5050    2e:5060    2f:5070
V + 8060    30:6000    31:6010    32:6020    33:6030    34:6040    35:6050    36:6060    37:6070
V + 8070    38:7000    39:7010    3a:7020    3b:7030    3c:7040    3d:7050    3e:7060    3f:7070
```

FIG. 8A

```
vd> pSx VICEMSP_DRAM:64                                                    401'
V + 8000    0:0000     1:1000     2:2000     3:3000     4:4000     5:5000     6:6000     7:7000
V + 8010    8:0010     9:1010     a:2010     b:3010     c:4010     d:5010     e:6010     f:7010
V + 8020    10:2000    11:2010    12:2020    13:2030    14:2040    15:2050    16:2060    17:2070
V + 8030    18:3000    19:3010    1a:3020    1b:3030    1c:3040    1d:3050    1e:3060    1f:3070
V + 8040    20:4000    21:4010    22:4020    23:4030    24:4040    25:4050    26:4060    27:4070
V + 8050    28:5000    29:5010    2a:5020    2b:5030    2c:5040    2d:5050    2e:5060    2f:5070
V + 8060    30:6000    31:6010    32:6020    33:6030    34:6040    35:6050    36:6060    37:6070
V + 8070    38:7000    39:7010    3a:7020    3b:7030    3c:7040    3d:7050    3e:7060    3f:7070
```

FIG. 8B

```
vd> pSx VICEMSP_DRAM:64                                                    401'
V + 8000    0:0000     1:1000     2:2000     3:3000     4:4000     5:5000     6:6000     7:7000
V + 8010    8:0010     9:1010     a:2010     b:3010     c:4010     d:5010     e:6010     f:7010
V + 8020    10:0020    11:1020    12:2020    13:3020    14:4020    15:5020    16:6020    17:7020
V + 8030    18:3000    19:3010    1a:3020    1b:3030    1c:3040    1d:3050    1e:3060    1f:3070
V + 8040    20:4000    21:4010    22:4020    23:4030    24:4040    25:4050    26:4060    27:4070
V + 8050    28:5000    29:5010    2a:5020    2b:5030    2c:5040    2d:5050    2e:5060    2f:5070
V + 8060    30:6000    31:6010    32:6020    33:6030    34:6040    35:6050    36:6060    37:6070
V + 8070    38:7000    39:7010    3a:7020    3b:7030    3c:7040    3d:7050    3e:7060    3f:7070
```

FIG. 8C

```
vd> pSx VICEMSP_DRAM:64                                                    401'
V + 8000    0:0000     1:1000     2:2000     3:3000     4:4000     5:5000     6:6000     7:7000
V + 8010    8:0010     9:1010     a:2010     b:3010     c:4010     d:5010     e:6010     f:7010
V + 8020    10:0020    11:1020    12:2020    13:3020    14:4020    15:5020    16:6020    17:7020
V + 8030    18:0030    19:1030    1a:2030    1b:3030    1c:4030    1d:5030    1e:6030    1f:7030
V + 8040    20:4000    21:4010    22:4020    23:4030    24:4040    25:4050    26:4060    27:4070
V + 8050    28:5000    29:5010    2a:5020    2b:5030    2c:5040    2d:5050    2e:5060    2f:5070
V + 8060    30:6000    31:6010    32:6020    33:6030    34:6040    35:6050    36:6060    37:6070
V + 8070    38:7000    39:7010    3a:7020    3b:7030    3c:7040    3d:7050    3e:7060    3f:7070
```

FIG. 8D

```
vd> pSx VICEMSP_DRAM:64                                            401'
V + 8000    0:0000    1:1000    2:2000    3:3000    4:4000    5:5000    6:6000    7:7000
V + 8010    8:0010    9:1010    a:2010    b:3010    c:4010    d:5010    e:6010    f:7010
V + 8020   10:0020   11:1020   12:2020   13:3020   14:4020   15:5020   16:6020   17:7020
V + 8030   18:0030   19:1030   1a:2030   1b:3030   1c:4030   1d:5030   1e:6030   1f:7030
V + 8040   20:0040   21:1040   22:2040   23:3040   24:4040   25:5040   26:6040   27:7040
V + 8050   28:5000   29:5010   2a:5020   2b:5030   2c:5040   2d:5050   2e:5060   2f:5070
V + 8060   30:6000   31:6010   32:6020   33:6030   34:6040   35:6050   36:6060   37:6070
V + 8070   38:7000   39:7010   3a:7020   3b:7030   3c:7040   3d:7050   3e:7060   3f:7070
```

FIG. 8E

```
vd> pSx VICEMSP_DRAM:64                                            401'
V + 8000    0:0000    1:1000    2:2000    3:3000    4:4000    5:5000    6:6000    7:7000
V + 8010    8:0010    9:1010    a:2010    b:3010    c:4010    d:5010    e:6010    f:7010
V + 8020   10:0020   11:1020   12:2020   13:3020   14:4020   15:5020   16:6020   17:7020
V + 8030   18:0030   19:1030   1a:2030   1b:3030   1c:4030   1d:5030   1e:6030   1f:7030
V + 8040   20:0040   21:1040   22:2040   23:3040   24:4040   25:5040   26:6040   27:7040
V + 8050   28:0050   29:1050   2a:2050   2b:3050   2c:4050   2d:5050   2e:6050   2f:7050
V + 8060   30:6000   31:6010   32:6020   33:6030   34:6040   35:6050   36:6060   37:6070
V + 8070   38:7000   39:7010   3a:7020   3b:7030   3c:7040   3d:7050   3e:7060   3f:7070
```

FIG. 8F

```
vd> pSx VICEMSP_DRAM:64                                            401'
V + 8000    0:0000    1:1000    2:2000    3:3000    4:4000    5:5000    6:6000    7:7000
V + 8010    8:0010    9:1010    a:2010    b:3010    c:4010    d:5010    e:6010    f:7010
V + 8020   10:0020   11:1020   12:2020   13:3020   14:4020   15:5020   16:6020   17:7020
V + 8030   18:0030   19:1030   1a:2030   1b:3030   1c:4030   1d:5030   1e:6030   1f:7030
V + 8040   20:0040   21:1040   22:2040   23:3040   24:4040   25:5040   26:6040   27:7040
V + 8050   28:0050   29:1050   2a:2050   2b:3050   2c:4050   2d:5050   2e:6050   2f:7050
V + 8060   30:0060   31:1060   32:2060   33:3060   34:4060   35:5060   36:6060   37:7060
V + 8070   38:7000   39:7010   3a:7020   3b:7030   3c:7040   3d:7050   3e:7060   3f:7070
```

FIG. 8G

```
vd> pSx VICEMSP_DRAM:64                                            401'
V + 8000    0:0000    1:1000    2:2000    3:3000    4:4000    5:5000    6:6000    7:7000
V + 8010    8:0010    9:1010    a:2010    b:3010    c:4010    d:5010    e:6010    f:7010
V + 8020   10:0020   11:1020   12:2020   13:3020   14:4020   15:5020   16:6020   17:7020
V + 8030   18:0030   19:1030   1a:2030   1b:3030   1c:4030   1d:5030   1e:6030   1f:7030
V + 8040   20:0040   21:1040   22:2040   23:3040   24:4040   25:5040   26:6040   27:7040
V + 8050   28:0050   29:1050   2a:2050   2b:3050   2c:4050   2d:5050   2e:6050   2f:7050
V + 8060   30:0060   31:1060   32:2060   33:3060   34:4060   35:5060   36:6060   37:7060
V + 8070   38:0070   39:1070   3a:2070   3b:3070   3c:4070   3d:5070   3e:6070   3f:7070
```

FIG. 8H

```
vd> pSx VICEMSP_DRAM+128:64                                       403
V + 8080    0:0000    1:0000    2:0000    3:0000    4:0000    5:0000    6:0000    7:0000
V + 8090    8:0000    9:0000    a:0000    b:0000    c:0000    d:0000    e:0000    f:0000
V + 80a0   10:0000   11:0000   12:0000   13:0000   14:0000   15:0000   16:0000   17:0000
V + 80b0   18:0000   19:0000   1a:0000   1b:0000   1c:0000   1d:0000   1e:0000   1f:0000
V + 80c0   20:0000   21:0000   22:0000   23:0000   24:0000   25:0000   26:0000   27:0000
V + 80d0   28:0000   29:0000   2a:0000   2b:0000   2c:0000   2d:0000   2e:0000   2f:0000
V + 80e0   30:0000   31:0000   32:0000   33:0000   34:0000   35:0000   36:0000   37:0000
V + 80f0   38:0000   39:0000   3a:0000   3b:0000   3c:0000   3d:0000   3e:0000   3f:0000
```

```
vd> pSx VICEMSP_DRAM+128:64                                                      403
V + 8080      0:0000      1:1010      2:2020      3:3030      4:4040      5:5050      6:6060      7:7070
V + 8090      8:0000      9:0000      a:0000      b:0000      c:0000      d:0000      e:0000      f:0000
V + 80a0     10:0000     11:0000     12:0000     13:0000     14:0000     15:0000     16:0000     17:0000
V + 80b0     18:0000     19:0000     1a:0000     1b:0000     1c:0000     1d:0000     1e:0000     1f:0000
V + 80c0     20:0000     21:0000     22:0000     23:0000     24:0000     25:0000     26:0000     27:0000
V + 80d0     28:0000     29:0000     2a:0000     2b:0000     2c:0000     2d:0000     2e:0000     2f:0000
V + 80e0     30:0000     31:0000     32:0000     33:0000     34:0000     35:0000     36:0000     37:0000
V + 80f0     38:0000     39:0000     3a:0000     3b:0000     3c:0000     3d:0000     3e:0000     3f:0000
```

FIG. 10A

```
vd> pSx VICEMSP_DRAM+128:64                                                      403
V + 8080      0:0000      1:1010      2:2020      3:3030      4:4040      5:5050      6:6060      7:7070
V + 8090      8:1000      9:2010      a:3020      b:4030      c:5040      d:6050      e:7060      f:0070
V + 80a0     10:0000     11:0000     12:0000     13:0000     14:0000     15:0000     16:0000     17:0000
V + 80b0     18:0000     19:0000     1a:0000     1b:0000     1c:0000     1d:0000     1e:0000     1f:0000
V + 80c0     20:0000     21:0000     22:0000     23:0000     24:0000     25:0000     26:0000     27:0000
V + 80d0     28:0000     29:0000     2a:0000     2b:0000     2c:0000     2d:0000     2e:0000     2f:0000
V + 80e0     30:0000     31:0000     32:0000     33:0000     34:0000     35:0000     36:0000     37:0000
V + 80f0     38:0000     39:0000     3a:0000     3b:0000     3c:0000     3d:0000     3e:0000     3f:0000
```

FIG. 10B

```
vd> pSx VICEMSP_DRAM+128:64                                                      403
V + 8080      0:0000      1:1010      2:2020      3:3030      4:4040      5:5050      6:6060      7:7070
V + 8090      8:1000      9:2010      a:3020      b:4030      c:5040      d:6050      e:7060      f:0070
V + 80a0     10:2000     11:3010     12:4020     13:5030     14:6040     15:7050     16:0060     17:1070
V + 80b0     18:0000     19:0000     1a:0000     1b:0000     1c:0000     1d:0000     1e:0000     1f:0000
V + 80c0     20:0000     21:0000     22:0000     23:0000     24:0000     25:0000     26:0000     27:0000
V + 80d0     28:0000     29:0000     2a:0000     2b:0000     2c:0000     2d:0000     2e:0000     2f:0000
V + 80e0     30:0000     31:0000     32:0000     33:0000     34:0000     35:0000     36:0000     37:0000
V + 80f0     38:0000     39:0000     3a:0000     3b:0000     3c:0000     3d:0000     3e:0000     3f:0000
```

FIG. 10C

```
vd> pSx VICEMSP_DRAM+128:64                                                      403
V + 8080      0:0000      1:1010      2:2020      3:3030      4:4040      5:5050      6:6060      7:7070
V + 8090      8:1000      9:2010      a:3020      b:4030      c:5040      d:6050      e:7060      f:0070
V + 80a0     10:2000     11:3010     12:4020     13:5030     14:6040     15:7050     16:0060     17:1070
V + 80b0     18:3000     19:4010     1a:5020     1b:6030     1c:7040     1d:0050     1e:1060     1f:2070
V + 80c0     20:0000     21:0000     22:0000     23:0000     24:0000     25:0000     26:0000     27:0000
V + 80d0     28:0000     29:0000     2a:0000     2b:0000     2c:0000     2d:0000     2e:0000     2f:0000
V + 80e0     30:0000     31:0000     32:0000     33:0000     34:0000     35:0000     36:0000     37:0000
V + 80f0     38:0000     39:0000     3a:0000     3b:0000     3c:0000     3d:0000     3e:0000     3f:0000
```

FIG. 10D

```
vd> pSx VICEMSP_DRAM+128:64                                                403
V + 8080    0:0000    1:1010    2:2020    3:3030    4:4040    5:5050    6:6060    7:7070
V + 8090    8:1000    9:2010    a:3020    b:4030    c:5040    d:6050    e:7060    f:0070
V + 80a0   10:2000   11:3010   12:4020   13:5030   14:6040   15:7050   16:0060   17:1070
V + 80b0   18:3000   19:4010   1a:5020   1b:6030   1c:7040   1d:0050   1e:1060   1f:2070
V + 80c0   20:4000   21:5010   22:6020   23:7030   24:0040   25:1050   26:2060   27:3070
V + 80d0   28:0000   29:0000   2a:0000   2b:0000   2c:0000   2d:0000   2e:0000   2f:0000
V + 80e0   30:0000   31:0000   32:0000   33:0000   34:0000   35:0000   36:0000   37:0000
V + 80f0   38:0000   39:0000   3a:0000   3b:0000   3c:0000   3d:0000   3e:0000   3f:0000
```

FIG. 10E

```
vd> pSx VICEMSP_DRAM+128:64                                                403
V + 8080    0:0000    1:1010    2:2020    3:3030    4:4040    5:5050    6:6060    7:7070
V + 8090    8:1000    9:2010    a:3020    b:4030    c:5040    d:6050    e:7060    f:0070
V + 80a0   10:2000   11:3010   12:4020   13:5030   14:6040   15:7050   16:0060   17:1070
V + 80b0   18:3000   19:4010   1a:5020   1b:6030   1c:7040   1d:0050   1e:1060   1f:2070
V + 80c0   20:4000   21:5010   22:6020   23:7030   24:0040   25:1050   26:2060   27:3070
V + 80d0   28:5000   29:6010   2a:7020   2b:0030   2c:1040   2d:2050   2e:3060   2f:4070
V + 80e0   30:0000   31:0000   32:0000   33:0000   34:0000   35:0000   36:0000   37:0000
V + 80f0   38:0000   39:0000   3a:0000   3b:0000   3c:0000   3d:0000   3e:0000   3f:0000
```

FIG. 10F

```
vd> pSx VICEMSP_DRAM+128:64                                                403
V + 8080    0:0000    1:1010    2:2020    3:3030    4:4040    5:5050    6:6060    7:7070
V + 8090    8:1000    9:2010    a:3020    b:4030    c:5040    d:6050    e:7060    f:0070
V + 80a0   10:2000   11:3010   12:4020   13:5030   14:6040   15:7050   16:0060   17:1070
V + 80b0   18:3000   19:4010   1a:5020   1b:6030   1c:7040   1d:0050   1e:1060   1f:2070
V + 80c0   20:4000   21:5010   22:6020   23:7030   24:0040   25:1050   26:2060   27:3070
V + 80d0   28:5000   29:6010   2a:7020   2b:0030   2c:1040   2d:2050   2e:3060   2f:4070
V + 80e0   30:6000   31:7010   32:0020   33:1030   34:2040   35:3050   36:4060   37:5070
V + 80f0   38:0000   39:0000   3a:0000   3b:0000   3c:0000   3d:0000   3e:0000   3f:0000
```

FIG. 10G

```
vd> pSx VICEMSP_DRAM+128:64                                                403
V + 8080    0:0000    1:1010    2:2020    3:3030    4:4040    5:5050    6:6060    7:7070
V + 8090    8:1000    9:2010    a:3020    b:4030    c:5040    d:6050    e:7060    f:0070
V + 80a0   10:2000   11:3010   12:4020   13:5030   14:6040   15:7050   16:0060   17:1070
V + 80b0   18:3000   19:4010   1a:5020   1b:6030   1c:7040   1d:0050   1e:1060   1f:2070
V + 80c0   20:4000   21:5010   22:6020   23:7030   24:0040   25:1050   26:2060   27:3070
V + 80d0   28:5000   29:6010   2a:7020   2b:0030   2c:1040   2d:2050   2e:3060   2f:4070
V + 80e0   30:6000   31:7010   32:0020   33:1030   34:2040   35:3050   36:4060   37:5070
V + 80f0   38:7000   39:0010   3a:1020   3b:2030   3c:3040   3d:4050   3e:5060   3f:6070
```

FIG. 10H vd> p $v0:64                                                                          204

| | | | | | | | |
|---|---|---|---|---|---|---|---|
| <u>0:0000</u> | 1:0010 | 2:0020 | 3:0030 | 4:0040 | 5:0050 | 6:0060 | 7:0070 ~ 0 |
| 8:1000 | <u>9:1010</u> | a:1020 | b:1030 | c:1040 | d:1050 | e:1060 | f:1070 ~ 1 |
| 10:2000 | 11:2010 | <u>12:2020</u> | 13:2030 | 14:2040 | 15:2050 | 16:2060 | 17:2070 ~ 2 |
| 18:3000 | 19:3010 | 1a:3020 | <u>1b:3030</u> | 1c:3040 | 1d:3050 | 1e:3060 | 1f:3070 ~ 3 |
| 20:4000 | 21:4010 | 22:4020 | 23:4030 | <u>24:4040</u> | 25:4050 | 26:4060 | 27:4070 ~ 4 |
| 28:5000 | 29:5010 | 2a:5020 | 2b:5030 | 2c:5040 | <u>2d:5050</u> | 2e:5060 | 2f:5070 ~ 5 |
| 30:6000 | 31:6010 | 32:6020 | 33:6030 | 34:6040 | 35:6050 | <u>36:6060</u> | 37:6070 ~ 6 |
| 38:7000 | 39:7010 | 3a:7020 | 3b:7030 | 3c:7040 | 3d:7050 | 3e:7060 | <u>3f:7070</u> ~ 7 |
| 50 | 51 | 52 | 53 | 54 | 55 | 56 | 57 |

FIG. 11A vd> p $v0:64                                                                          204

| | | | | | | | |
|---|---|---|---|---|---|---|---|
| 0:0000 | <u>1:1000</u> | 2:0020 | 3:0030 | 4:0040 | 5:0050 | 6:0060 | 7:0070 ~ 0 |
| 8:1000 | 9:1010 | <u>a:2010</u> | b:1030 | c:1040 | d:1050 | e:1060 | f:1070 ~ 1 |
| 10:2000 | 11:2010 | 12:2020 | <u>13:3020</u> | 14:2040 | 15:2050 | 16:2060 | 17:2070 ~ 2 |
| 18:3000 | 19:3010 | 1a:3020 | 1b:3030 | <u>1c:4030</u> | 1d:3050 | 1e:3060 | 1f:3070 ~ 3 |
| 20:4000 | 21:4010 | 22:4020 | 23:4030 | 24:4040 | <u>25:5040</u> | 26:4060 | 27:4070 ~ 4 |
| 28:5000 | 29:5010 | 2a:5020 | 2b:5030 | 2c:5040 | 2d:5050 | <u>2e:6050</u> | 2f:5070 ~ 5 |
| 30:6000 | 31:6010 | 32:6020 | 33:6030 | 34:6040 | 35:6050 | 36:6060 | <u>37:7060</u> ~ 6 |
| <u>38:0070</u> | 39:7010 | 3a:7020 | 3b:7030 | 3c:7040 | 3d:7050 | 3e:7060 | 3f:7070 ~ 7 |
| 50 | 51 | 52 | 53 | 54 | 55 | 56 | 57 |

FIG. 11B vd> p $v0:64                                                                          204

| | | | | | | | |
|---|---|---|---|---|---|---|---|
| 0:0000 | 1:1000 | <u>2:2000</u> | 3:0030 | 4:0040 | 5:0050 | 6:0060 | 7:0070 ~ 0 |
| 8:1000 | 9:1010 | a:2010 | <u>b:3010</u> | c:1040 | d:1050 | e:1060 | f:1070 ~ 1 |
| 10:2000 | 11:2010 | 12:2020 | 13:3020 | <u>14:4020</u> | 15:2050 | 16:2060 | 17:2070 ~ 2 |
| 18:3000 | 19:3010 | 1a:3020 | 1b:3030 | 1c:4030 | <u>1d:5030</u> | 1e:3060 | 1f:3070 ~ 3 |
| 20:4000 | 21:4010 | 22:4020 | 23:4030 | 24:4040 | 25:5040 | <u>26:6040</u> | 27:4070 ~ 4 |
| 28:5000 | 29:5010 | 2a:5020 | 2b:5030 | 2c:5040 | 2d:5050 | 2e:6050 | <u>2f:7050</u> ~ 5 |
| <u>30:0060</u> | 31:6010 | 32:6020 | 33:6030 | 34:6040 | 35:6050 | 36:6060 | 37:7060 ~ 6 |
| 38:0070 | <u>39:1070</u> | 3a:7020 | 3b:7030 | 3c:7040 | 3d:7050 | 3e:7060 | 3f:7070 ~ 7 |
| 50 | 51 | 52 | 53 | 54 | 55 | 56 | 57 |

FIG. 11C vd> p $v0:64                                                                          204

| | | | | | | | |
|---|---|---|---|---|---|---|---|
| 0:0000 | 1:1000 | 2:2000 | <u>3:3000</u> | 4:0040 | 5:0050 | 6:0060 | 7:0070 ~ 0 |
| 8:1000 | 9:1010 | a:2010 | b:3010 | <u>c:4010</u> | d:1050 | e:1060 | f:1070 ~ 1 |
| 10:2000 | 11:2010 | 12:2020 | 13:3020 | 14:4020 | <u>15:5020</u> | 16:2060 | 17:2070 ~ 2 |
| 18:3000 | 19:3010 | 1a:3020 | 1b:3030 | 1c:4030 | 1d:5030 | <u>1e:6030</u> | 1f:3070 ~ 3 |
| 20:4000 | 21:4010 | 22:4020 | 23:4030 | 24:4040 | 25:5040 | 26:6040 | <u>27:7040</u> ~ 4 |
| <u>28:0050</u> | 29:5010 | 2a:5020 | 2b:5030 | 2c:5040 | 2d:5050 | 2e:6050 | 2f:7050 ~ 5 |
| 30:0060 | <u>31:1060</u> | 32:6020 | 33:6030 | 34:6040 | 35:6050 | 36:6060 | 37:7060 ~ 6 |
| 38:0070 | 39:1070 | <u>3a:2070</u> | 3b:7030 | 3c:7040 | 3d:7050 | 3e:7060 | 3f:7070 ~ 7 |
| 50 | 51 | 52 | 53 | 54 | 55 | 56 | 57 |

FIG. 11D vd> p $v0:64
                                                                    204

|     |         |         |         |         |         |         |         |         |   |
|-----|---------|---------|---------|---------|---------|---------|---------|---------|---|
|     | 0:0000  | 1:1000  | 2:2000  | 3:3000  | 4:4000  | 5:0050  | 6:0060  | 7:0070  | 0 |
|     | 8:1000  | 9:1010  | a:2010  | b:3010  | c:4010  | d:5010  | e:1060  | f:1070  | 1 |
|     | 10:2000 | 11:2010 | 12:2020 | 13:3020 | 14:4020 | 15:5020 | 16:6020 | 17:2070 | 2 |
|     | 18:3000 | 19:3010 | 1a:3020 | 1b:3030 | 1c:4030 | 1d:5030 | 1e:6030 | 1f:7030 | 3 |
|     | 20:0040 | 21:4010 | 22:4020 | 23:4030 | 24:4040 | 25:5040 | 26:6040 | 27:7040 | 4 |
|     | 28:0050 | 29:1050 | 2a:5020 | 2b:5030 | 2c:5040 | 2d:5050 | 2e:6050 | 2f:7050 | 5 |
|     | 30:0060 | 31:1060 | 32:2060 | 33:6030 | 34:6040 | 35:6050 | 36:6060 | 37:7060 | 6 |
|     | 38:0070 | 39:1070 | 3a:2070 | 3b:3070 | 3c:7040 | 3d:7050 | 3e:7060 | 3f:7070 | 7 |
|     | 50      | 51      | 52      | 53      | 54      | 55      | 56      | 57      |   |

FIG. 11E vd> p $v0:64
                                                                    204

|     |         |         |         |         |         |         |         |         |   |
|-----|---------|---------|---------|---------|---------|---------|---------|---------|---|
|     | 0:0000  | 1:1000  | 2:2000  | 3:3000  | 4:4000  | 5:5000  | 6:0060  | 7:0070  | 0 |
|     | 8:1000  | 9:1010  | a:2010  | b:3010  | c:4010  | d:5010  | e:6010  | f:1070  | 1 |
|     | 10:2000 | 11:2010 | 12:2020 | 13:3020 | 14:4020 | 15:5020 | 16:6020 | 17:7020 | 2 |
|     | 18:0030 | 19:3010 | 1a:3020 | 1b:3030 | 1c:4030 | 1d:5030 | 1e:6030 | 1f:7030 | 3 |
|     | 20:0040 | 21:1040 | 22:4020 | 23:4030 | 24:4040 | 25:5040 | 26:6040 | 27:7040 | 4 |
|     | 28:0050 | 29:1050 | 2a:2050 | 2b:5030 | 2c:5040 | 2d:5050 | 2e:6050 | 2f:7050 | 5 |
|     | 30:0060 | 31:1060 | 32:2060 | 33:3060 | 34:6040 | 35:6050 | 36:6060 | 37:7060 | 6 |
|     | 38:0070 | 39:1070 | 3a:2070 | 3b:3070 | 3c:4070 | 3d:7050 | 3e:7060 | 3f:7070 | 7 |
|     | 50      | 51      | 52      | 53      | 54      | 55      | 56      | 57      |   |

FIG. 11F vd> p $v0:64
                                                                    204

|     |         |         |         |         |         |         |         |         |   |
|-----|---------|---------|---------|---------|---------|---------|---------|---------|---|
|     | 0:0000  | 1:1000  | 2:2000  | 3:3000  | 4:4000  | 5:5000  | 6:6000  | 7:0070  | 0 |
|     | 8:1000  | 9:1010  | a:2010  | b:3010  | c:4010  | d:5010  | e:6010  | f:7010  | 1 |
|     | 10:0020 | 11:2010 | 12:2020 | 13:3020 | 14:4020 | 15:5020 | 16:6020 | 17:7020 | 2 |
|     | 18:0030 | 19:1030 | 1a:3020 | 1b:3030 | 1c:4030 | 1d:5030 | 1e:6030 | 1f:7030 | 3 |
|     | 20:0040 | 21:1040 | 22:2040 | 23:4030 | 24:4040 | 25:5040 | 26:6040 | 27:7040 | 4 |
|     | 28:0050 | 29:1050 | 2a:2050 | 2b:3050 | 2c:5040 | 2d:5050 | 2e:6050 | 2f:7050 | 5 |
|     | 30:0060 | 31:1060 | 32:2060 | 33:3060 | 34:4060 | 35:6050 | 36:6060 | 37:7060 | 6 |
|     | 38:0070 | 39:1070 | 3a:2070 | 3b:3070 | 3c:4070 | 3d:5070 | 3e:7060 | 3f:7070 | 7 |
|     | 50      | 51      | 52      | 53      | 54      | 55      | 56      | 57      |   |

FIG. 11G vd> p $v0:64
                                                                    204

|     |         |         |         |         |         |         |         |         |   |
|-----|---------|---------|---------|---------|---------|---------|---------|---------|---|
|     | 0:0000  | 1:1000  | 2:2000  | 3:3000  | 4:4000  | 5:5000  | 6:6000  | 7:7000  | 0 |
|     | 8:0010  | 9:1010  | a:2010  | b:3010  | c:4010  | d:5010  | e:6010  | f:7010  | 1 |
|     | 10:0020 | 11:1020 | 12:2020 | 13:3020 | 14:4020 | 15:5020 | 16:6020 | 17:7020 | 2 |
|     | 18:0030 | 19:1030 | 1a:2030 | 1b:3030 | 1c:4030 | 1d:5030 | 1e:6030 | 1f:7030 | 3 |
|     | 20:0040 | 21:1040 | 22:2040 | 23:3040 | 24:4040 | 25:5040 | 26:6040 | 27:7040 | 4 |
|     | 28:0050 | 29:1050 | 2a:2050 | 2b:3050 | 2c:4050 | 2d:5050 | 2e:6050 | 2f:7050 | 5 |
|     | 30:0060 | 31:1060 | 32:2060 | 33:3060 | 34:4060 | 35:5060 | 36:6060 | 37:7060 | 6 |
|     | 38:0070 | 39:1070 | 3a:2070 | 3b:3070 | 3c:4070 | 3d:5070 | 3e:6070 | 3f:7070 | 7 |
|     | 50      | 51      | 52      | 53      | 54      | 55      | 56      | 57      |   |

FIG. 11H

INSTRUCTION METHODS FOR PERFORMING DATA FORMATTING WHILE MOVING DATA BETWEEN MEMORY AND A VECTOR REGISTER FILE

BACKGROUND OF THE INVENTION

1. Field of the Invention

The present invention relates to the field of computer controlled graphic display systems. More specifically, the present invention relates to graphics data movement mechanisms for registers in graphics processors and memory.

2. Prior Art

Within the field of computer controlled graphic display systems ("computer systems"), image data is often presented within certain data formats. This image data typically represents images that are stored in raster formats (e.g., pixel data, texture maps, etc.). To process the image data, certain sections or portions of the data are processed sequentially by a graphics processor or a group of graphics processors working in parallel (e.g., a Single Instruction Multiple Data, SIMD computer environment). During processing, repetitive operations are often performed on the image data portions in order to generate image signals for direct or delayed viewing.

During the repetitive operations, image data is typically moved from long term nonvolatile storage memory (e.g., a hard drive) to volatile memory. Then, the image data is typically "loaded" from main memory (e.g., volatile memory, RAM) into special register files of the computer system. The processor of the computer system uses special high speed circuitry to perform processing steps on the image data located within the register files. These operations read the register files, process data, and store information back into the registers files. Once the data processing completes, the image data within the register files is then "stored" back into main memory (which can include the memory of the frame buffer which, when loaded, renders the image data on a display screen). Alternatively, the processor can also directly load data into memory. Therefore, during image processing, data is routinely moved, over and over, from memory to the register file and then to memory again.

In many instances, the image data format is known by the computer system or is of a universal or standard format. In these cases, certain data transfer operations are performed by the processor in a repetitive fashion as a result of the universal data format.

The value of computer controlled graphic display systems is often measured based on their performance (e.g., image processing speed). Image generation and processing performance is increased by increasing the efficiency by which image data is accessed and moved within a computer controlled graphic display system. Therefore, it is advantageous to provide effective methods by which image data is loaded from volatile memory to the processor's register file and back to memory again. In this way, by the system's image processing throughput (e.g., bandwidth) is increased. The present invention provides such advantageous functionality.

SUMMARY OF THE INVENTION

Instruction methods are described for moving data between memory and a vector register file while performing data formatting. The present invention methods are implemented as instructions that are executed by a processor having a vector register file and a memory unit. These novel methods are particularly useful in the computer controlled graphics art because they allow more efficient movement and processing of raster formatted graphics data. The vector register file has a number of vector registers (e.g., 32) that each contain 128 bits of storage. A cross bar circuit in a data bus allows 8 16-bit portions of 8 vector registers to be updated simultaneously. The crossbar circuit can also simultaneously access eight data portions of a single row (quad word) of memory. In one class of instructions, eight byte locations within a memory quad word are simultaneously loaded into eight separate 16 bit locations of a single 128-bit register within the register file. The data can be integer or fraction and signed or unsigned. The data can also be stored from the register file back to memory using analogous store instructions. In a second class of instructions, alternate locations of a memory quad word are selected and simultaneously loaded into locations of a register of the register file. In this class, the data can also be stored from the register file back to memory. In a third class, data is obtained across a quad word boundary by a first instruction that obtains a first part and stores it in a register and a second (e.g., rest) instruction that obtains the remainder part crossing the boundary and stores in the register. In a last class of instruction transfers, a block (e.g., 8 16-bit×8 16-bit) of data is loaded from memory, stored in the register file and stored back into memory causing a transposition of the data block. Alternatively, a block (e.g., 8 16-bit×8 16-bit) of data is stored from the register file to memory, and loaded back into the register file causing a transposition of the data block. In either case, the transposition is completed in 16 clock cycles.

BRIEF DESCRIPTION OF THE DRAWINGS

FIG. 6A and FIG. 6B illustrate an N×N matrix transposition where N is 4.

FIG. 6D illustrates an exemplary N×N matrix stored in memory in accordance with an embodiment of the present invention.

FIGS. 7A through 7H illustrates the contents of eight registers of the register file during eight executions of the LTWV instruction of the present invention as a first part of a transpose operation.

FIGS. 8A through 8H illustrate the contents of eight registers of the register file during eight executions of the SWV instruction of the present invention as a second part of the transpose operation of FIGS. 7A through 7H.

FIG. 9A and FIG. 9B illustrate the initial contents of an N×N matrix in memory and the contents of eight registers of the register file of the present invention, respectively, before a transpose operation.

FIGS. 10A through 10H illustrate the contents of an N×N matrix within memory during eight executions of the STV instruction of the present invention as a first part of a transpose operation.

FIGS. 11A through 11H illustrate the contents of eight registers of the register file during eight executions of the LTWV instruction of the present invention as a second part of the transpose operation of FIGS. 10A through 10H.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

COMPUTER SYSTEM ENVIRONMENT

Figure 1:
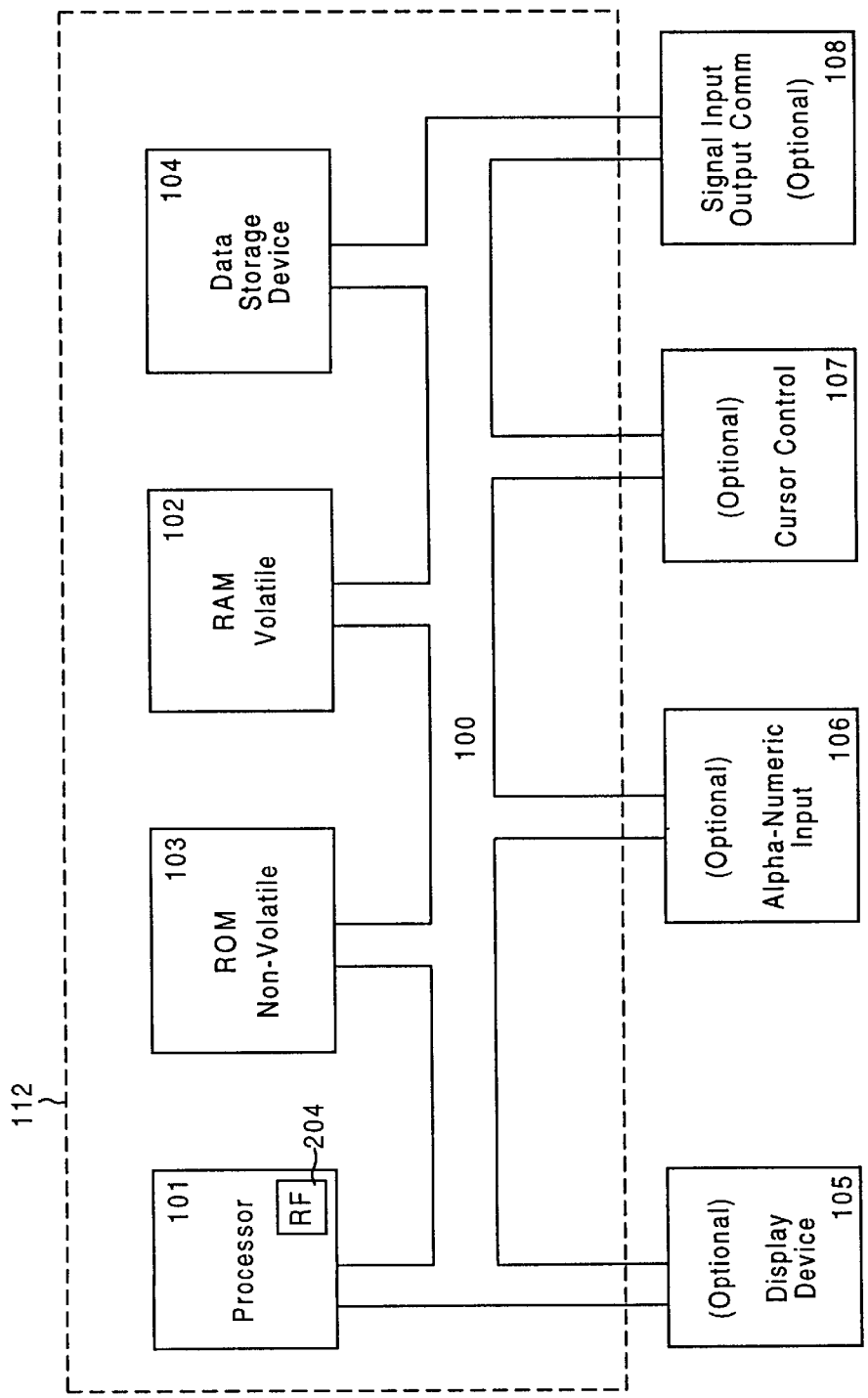
FIG. 1 illustrates an exemplary embodiment of the present invention computer system.

Refer to FIG. 1 which illustrates a computer system 112. Within the following discussions of the present invention, certain instructions are provided for efficiently moving data between a register file 204 of a processor 101 and a memory unit (e.g., 102). These elements are discussed below in relation to a general purpose computer system 112.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. Address bus 110, as described further in FIG. 2C, contains a cross bar switching circuit. Memory unit 102 is a 128-bits wide memory and contains two banks of 64 bits each. Data within memory 102 can be aligned along 128 bit boundaries (a quad word). Within one embodiment, memory 102 contains graphics image data for processing and rendering for visualization. System 112 of FIG. 1 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101.

Computer readable memory units, described above, are for containing image processing data that is defined as any two dimensional blocks of pixels. These pixels can be in the format of file system images, fields or frames of video entering system 112 through video ports, mass storage devices (e.g., 104), or network ports. Processor 101 in one implementation is a vector unit (VU) which can act as a coprocessor for a host processor (not shown). In one embodiment, the VU 101 performs arithmetic and logical operations on individual data elements within a data word using fixed point format. Data words are treated as vectors of N×1 elements where N is either 8 or 16. In one embodiment, the VU 101 is organized as a Single Instruction, Multiple Data (SIMD) compute engine where each instruction performs the same operation on each element within a vector in parallel. The VU 101 is organized as eight identical slices (also called register "locations"), each 16 bits wide, which are connected in parallel. The VU 101 can operate on data that is the full width of the local on-chip memories 102, up to 128 bits. This allows parallel operations on 8 or 16 vector elements in one cycle where each element is 16-bits or 8-bits. It is appreciated, however, that a number of different processors 101 can take advantage of the instruction methods of the present invention and the above described VU 101 is but one exemplary embodiment. The VU 101 can operate on data that is signed, unsigned, integer or floating point.

Figure 2A:
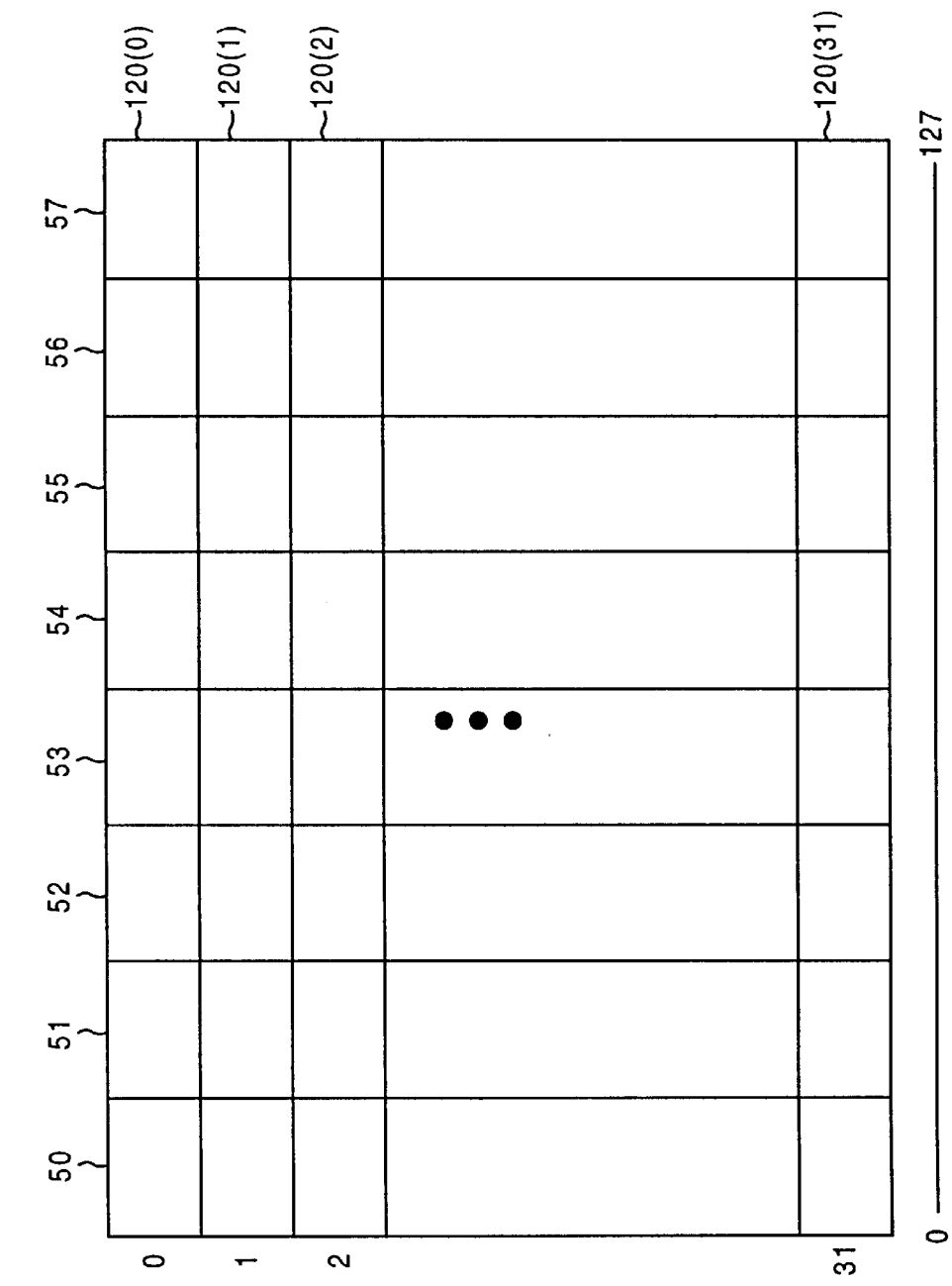
FIG. 2A illustrates the configuration of one embodiment of the vector register file of the present invention.
Figure 2B:
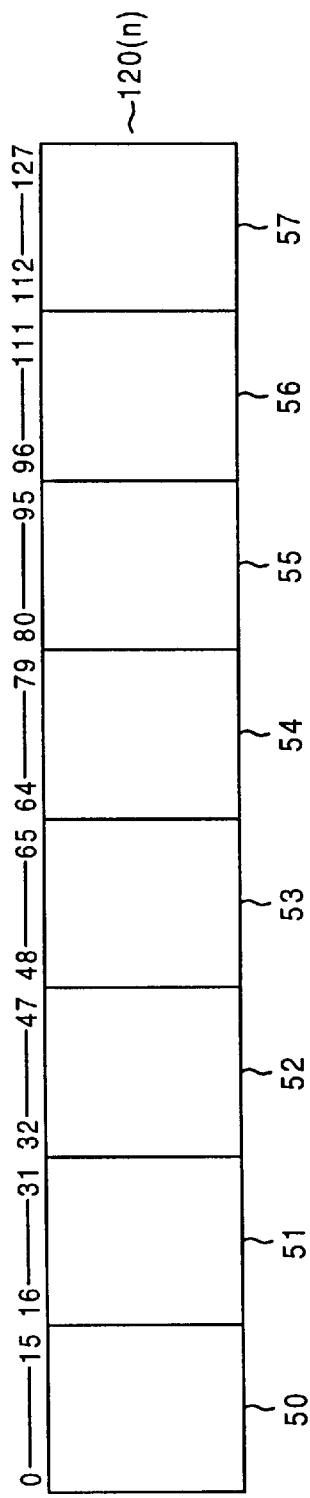
FIG. 2B illustrates the configuration of one vector of the vector register file of the present invention.

As shown in FIG. 2A, the VU 101 contains a register file 204 that contains a number (e.g., 32) of 128-bit general purpose vector registers 120(0) to 120(31). Each vector register, VR, is divided into eight slices, S0 to S7, each slice (or "location") contains 16 bits. The present invention can store a different 16 bit (or less) value into one of eight slices of eight VRs at the same time such that eight different values are moved simultaneously. Within each VR, data can be written, or read, as bytes (8-bits), short-words (16-bits) "shorts", words (32-bits), double words (64-bits) "doubles" or quad-words (128-bits) "quads." FIG. 2B illustrates one VR 120(n) shown in detail. The bits of the VR 120(n) associated with each of the eight slices 50–57 are shown in FIG. 2B. For instance, bits 96 to 111 are associated with slice S6.

Figure 2C:
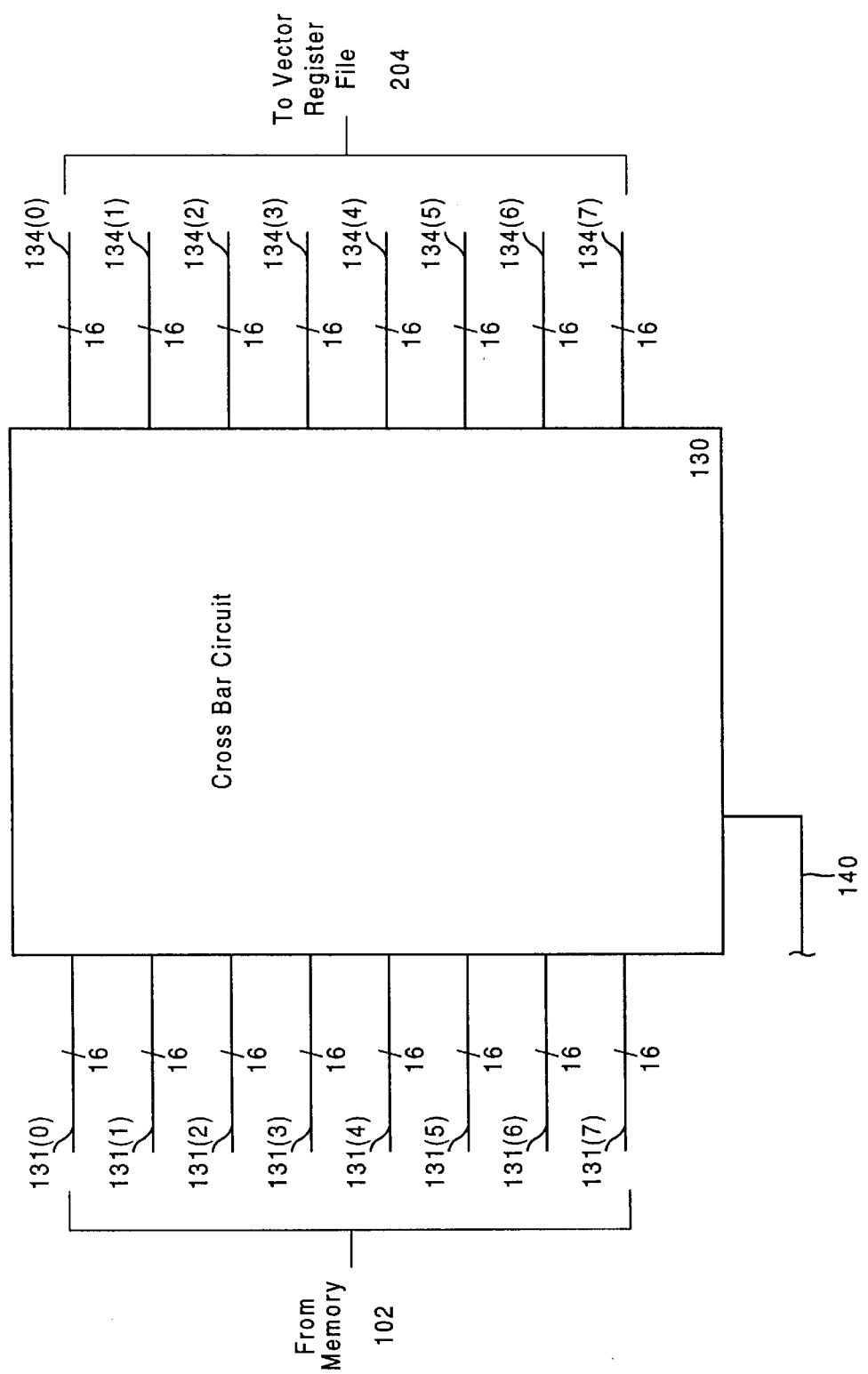
FIG. 2C illustrates the crossbar circuit of the present invention.

FIG. 2C illustrates a cross bar circuit 130 in accordance with the present invention. The cross bar circuit 130, controlled by control line 140, facilitates movement of several data portions between the register file 204 and memory 102 in parallel. The cross bar circuit 130 can receive (or output over) sets of 16-bit data lines 131(0) to 131(7) that originate from a particular sequence of consecutive data portions (byte, shortword) of a quad word boundary in memory 102. Each data line corresponds to a different halfword (maximum). Once a starting address, addr, is known of the quad word, data buses 131(0) to 131(7) are active and couple with halfword (0) to halfword(7), respectively, of the quad word. If bytes are to be accessed then only half of the 16-bits on each line are active.

The cross bar circuit 130 also receives (or outputs over) eight slice data lines 134(0) to 134(7), each 16-bits wide. Each of these slice lines can be routed to any respective slice number of any VR within register file 204. In other words, slice line 134(1) can be routed to any slice (e.g., S1) of any VR 120(0–31) and slice line 134(6) can be routed to any slice (e.g., S6) of any VR 120(0–31). In this way, within one clock cycle, up to eight halfword values (or less) can be interchanged between (1) eight slices of the VRs of the register file 204 and (2) eight halfwords of a particular quad word in memory 102. The cross bar circuit 130 contains the necessary address routing resources to facilitate the above data transfer according to control signals received over bus 140. It is appreciated that within the cross bar circuit 130, any one of the lines 131(0–7) can be coupled with any one of the data lines 134(0–7).

Load instructions of the present invention move data between the on-chip data RAM (e.g., 102) and the register file 204. The load instructions, except for the Rest and Transpose instructions, operate in a similar manner. The general operation of the load instructions is as follows: the contents of an SR register specified by a base field of the instruction are added to an offset field to generate an effective byte address, addr, in memory 102. The contents of the base register represent a byte address in memory 102. Offset is an index based on the size of the data item to be moved and, in one embodiment, is required to be properly weighted before adding to the contents of the base register. If the data item to be moved is not a single byte, offset is then shifted left 1, 2, 3, or 4 bit positions to achieve the proper weighting. The data item starting at the effective byte address (addr) in memory 102 is loaded into the vector register specified by the vt field. A read from data RAM 102 accesses two double word elements, address and adress+8. With this addressing scheme, any data read requiring less than a quad word of data returns the requested data. In some cases where the data size is a quad word, the combination of the byte address and item size can cause some portion of the desired data to be in the next higher doubleword in memory than that addressed by address+8. In this case, only the portion of the data in the currently accessed memory doubled word is fetched. The remaining data that is not fetched, can be accessed with a second instruction using the Load Rest instruction (described below in the group IV load instructions).

The element field specifies the alignment for storing the data in the VR of the register file 204. The element field is treated as a byte address within the VR. For byte loads, the element field can be any number between 0 and 15. For larger data items, the element field is restricted to values that result in all the data to be moved being stored into the VR specified by Vt.

The operation of the Load/Store Rest instructions is different from the other Load/Store instructions. In memory 102, all the other Load/Store instructions operate on the bytes between the effective byte addresses and byte 15 of the accessed quad word (doubleword pair), inclusive. The Rest instructions move the bytes in memory 102 between byte 0 of the accessed quad word and the effective byte address, inclusive. The operation of the Load/Store Rest instruction is similarly different from the other Load/Store instructions with respect to the register file 204. These differences become clear below with respect to the group IV instructions.

PRESENT INVENTION LOAD INSTRUCTIONS

The following instructions of the present invention can be arranged in the following grouping, (I) instructions that perform single byte loads (with data type conversion) from the memory 102 to the vector register file 204; (II) instructions that perform simultaneous multiple byte loads (with data type conversion) from memory 102 to the vector register file 204; (III) instructions that load alternate data portions (simultaneously) from memory 102 to the vector register file 204; (IV) instructions that load 128-bit data portions that cross 128-bit boundaries in two cycles; and (V) loads and stores that perform matrix transpositions. These instructions are discussed below:

GROUP I LOADS

Load Byte to Vector Unit (LBV). In the present invention LBV instruction, the contents of the scalar register, base, added to the offset form the effective byte address, addr, in memory 102. The byte at the effective addresses in memory is loaded into the byte of the vector register, vt, as specified by the element value. Alignment of data in memory 102 is on a byte boundary.

LBV contains the following exemplary format: LBV vt[element], offset(base). In operation, the LBV instruction is executed according to the following procedure:

$$addr31..0 \leftarrow SR[base] + offset$$
$$e \leftarrow element$$
$$VR[vt]_{8*e+7..8*e} \leftarrow mem[addr31..0]_{7..0}$$

where addr1 is the first bit of address addr, addr0 is the zero bit of addr, etc., VR[vt] is the vector register number (of the vector register file 204) indicated by vt and subscripted values indicate the particular bits of the identified value involved in the data move. The syntax mem[x] indicates the value stored in memory 102 at location x. The syntax mem[x]$_y$ indicates the bits y of the value stored in memory 102 at location x. Moves are performed according to the below convention:

$$destination \leftarrow source.$$

Figure 4A:
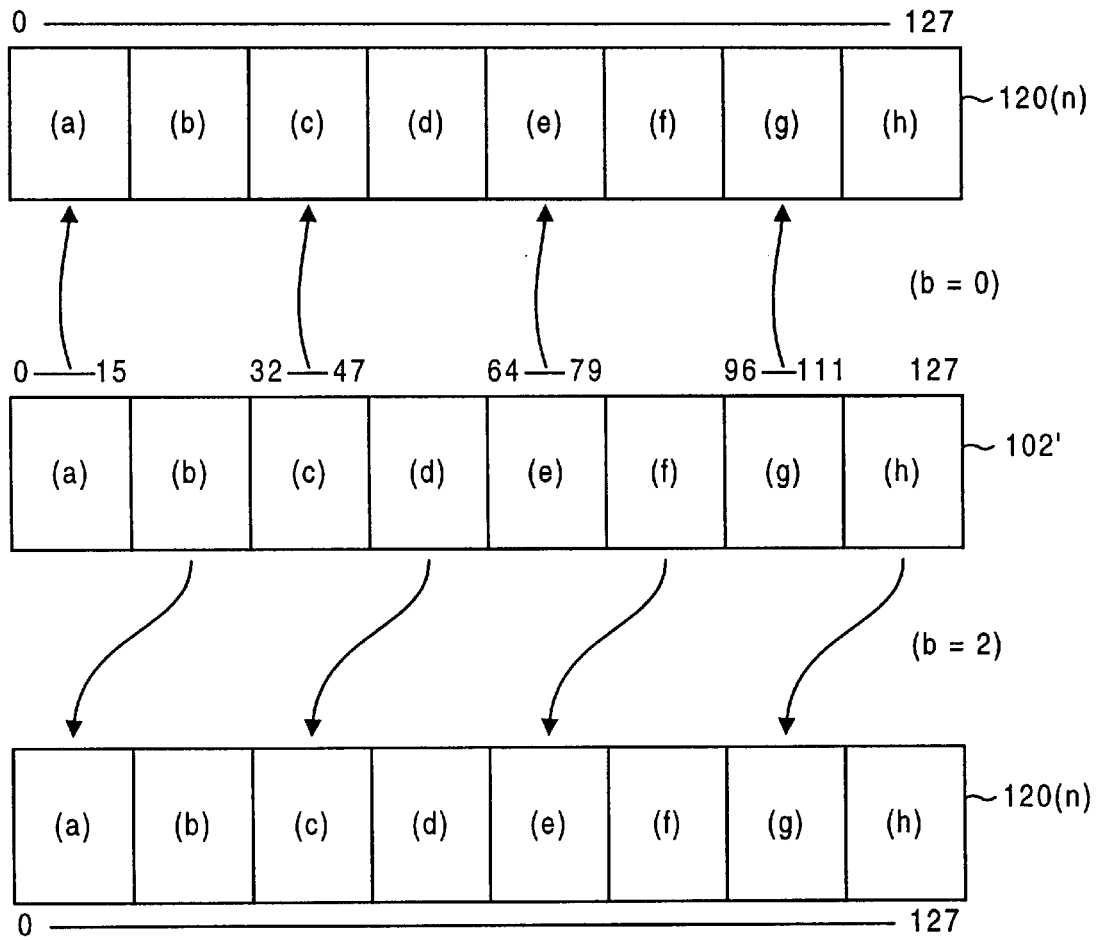
FIG. 4A illustrates a logical flow diagram for the LAV instruction of the present invention.
Figure 4B:
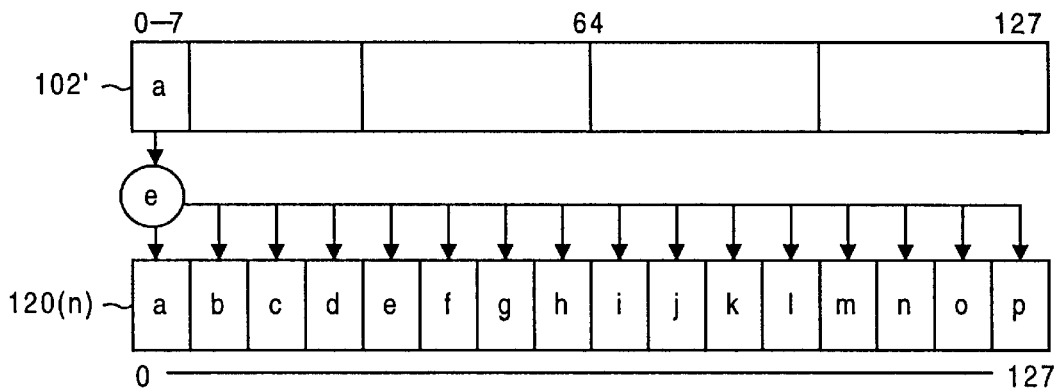
FIG. 4B illustrates a logical flow diagram for the LBV instruction of the present invention.

FIG. 4B illustrates a data transfer under the LBV instruction. Byte (a) of a quad word 102' of memory 102 is accessed and depending on the value, e, is routed through crossbar circuit 130 and stored in one of the following bytes, a, b, c, . . ., p, of a vector register 120(n) identified by vt. Byte (a) can originate from any byte location within 102'.

Load Short Word to Vector Unit (LSV). In the present invention LSV instruction, the contents of the scalar register, base, are added to the offset (for this instruction, offset is defined to be increments of halfwords), to form the effective address, addr, in memory 102. The halfword at the effective address in memory is loaded into the halfword of vector register, vt, as specified by the element value. Alignment of data in memory 102 is on a byte boundary. In one embodiment, element is restricted to 0, 2, 4, 6, 8, 10, 12 or 14. LSV contains the following exemplary format: LSV vt[element], offset(base). In operation, the LSV instruction is executed according to the following procedure:

$$addr31..0 \leftarrow SR[base] + (offset *2)$$
$$e \leftarrow element$$
$$VR[vt]_{8*e+15..8*e} \leftarrow mem[addr31..0]_{15..0}$$

Figure 4C:
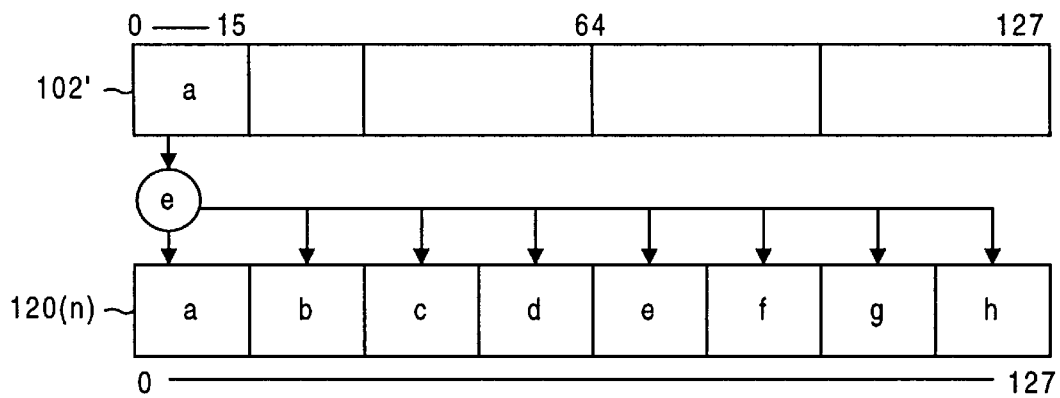
FIG. 4C illustrates a logical flow diagram for the LSV instruction of the present invention.

FIG. 4C illustrates a data transfer under the LSV instruction. Short word (a) of a quad word 102' of memory 102 is accessed and depending on the value, e, is routed through crossbar circuit 130 and stored in one of the following short words, a, b, c, . . . , h, of a vector register 120(n) identified by vt. Short word (a) can originate from any short word location within 102'. Load Long Word to Vector Unit (LLV). In the present invention LLV instruction, the contents of the scalar register, base, are added to the offset (for this instruction, offset is defined to be increments of longwords), to form the effective address, addr, in memory 102. The word at the effective address in memory is loaded into the word of vector register, vt, as specified by the element value. Alignment of data in memory 102 is on a byte boundary. LLV contains the following exemplary format: LLV vt[element], offset(base). In one embodiment, element is restricted to 0, 4, 8, or 12. In operation, the LLV instruction is executed according to the following procedure:

```
addr31..0 ← SR[base] + (offset *4)
e ← element
VR[vt]_{8*e+31..8*e}             ← mem[addr31..0]_{31..0}
```

Figure 4D:
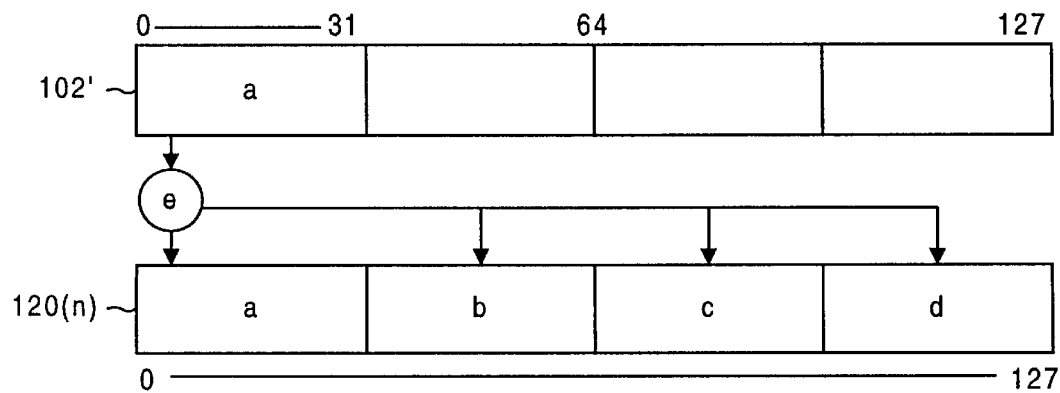
FIG. 4D illustrates a logical flow diagram for the LLV instruction of the present invention.

FIG. 4D illustrates a data transfer under the LLV instruction. Longword (a) of a quad word 102' of memory 102 is accessed and depending on the value, e, is routed through crossbar circuit 130 and stored in one of the following longwords, a, b, c, d, of a vector register 120(n) identified by vt. Longword (a) can originate from any longword location within 102'.

Load Double Word to Vector Unit (LDV). In the present invention LDV instruction, the contents of the scalar register, base, are added to the offset (for this instruction, offset is defined to be increments of doublewords), to form the effective address, addr, in memory 102. The doubleword at the effective address in memory is loaded into the doubleword of vector register, vt as specified by the element value. Alignment of data in memory 102 is on byte boundaries.

LDV contains the following exemplary format: LDV vt[element], offset(base). In one embodiment, element is restricted to 0 or 8. In operation, the LDV instruction is executed according to the following procedure:

```
addr31..0 ← SR[base] + (offset *8)
e ← element
VR[vt]_{8*e+63..8*e}             ← mem[addr31..0]_{63..0}
```

Figure 4E:
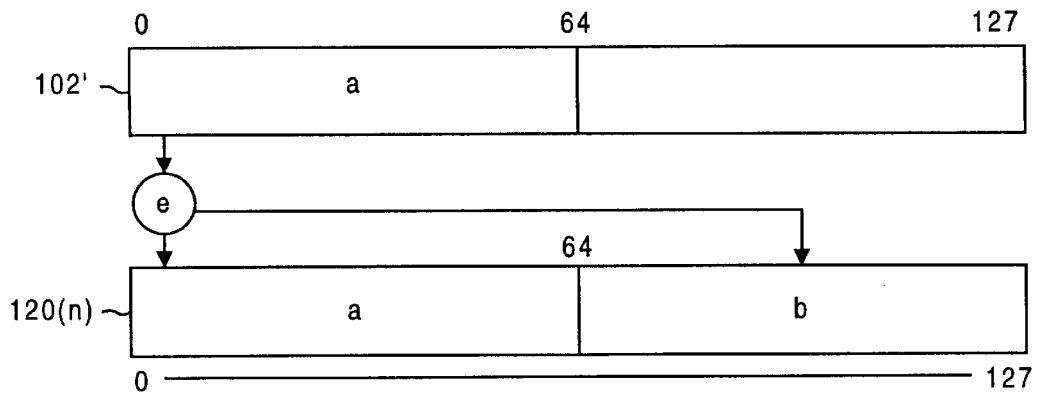
FIG. 4E illustrates a logical flow diagram for the LDV instruction of the present invention.

FIG. 4E illustrates a data transfer under the LDV instruction. Doubleword (a) of a quad word 102' of memory 102 is accessed and depending on the value, e, is routed through crossbar circuit 130 and stored in one of the following doublewords, a, b, of a vector register 120(n) identified by vt. Doubleword (a) can originate from any doubleword location within 102'.

GROUP II LOADS

Figure 5A:
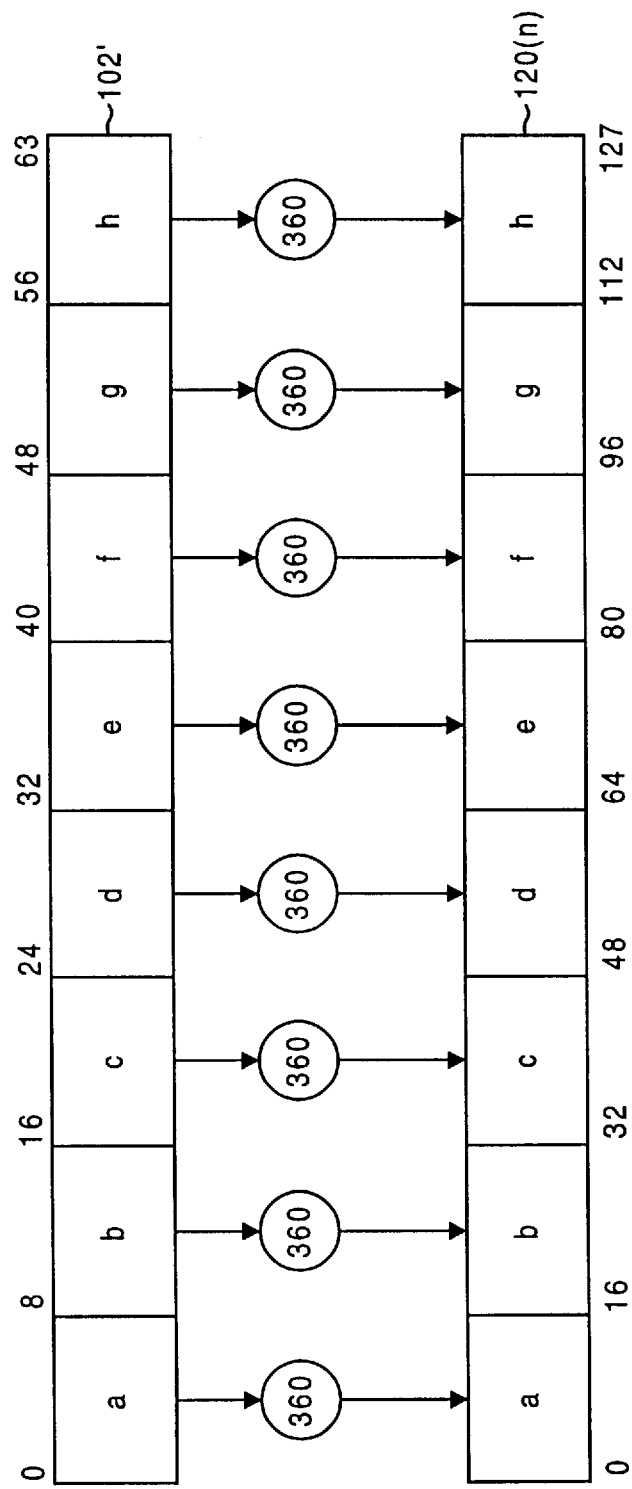
FIG. 5A illustrates a logical flow diagram for the LPV, LUV, LXV, and LZV instructions of the present invention.

Load Packed Signed to Vector Unit (LPV). In the LPV instruction of the present invention, the contents of the scalar register base are added to the offset (for this instruction, offset is defined to be increments of doublewords) to form the effective byte address, addr, in memory 102. The 8 consecutive bytes starting at the effective address in memory 102 are simultaneously loaded into the most significant byte of each halfword of vector register, vt. The least significant byte of vector register, vt, is zeroed. Alignment of data in memory 102 is on byte boundaries. Element is restricted to a value of 0, in this embodiment. LPV contains the following exemplary format: LPV vt[element], offset(base). In operation, the LPV instruction is executed according to the following procedure where all data is moved simultaneously:

```
addr31..0 ← SR[base] + (offset*8)
VR[vt]_{127..112}       ← mem[addr31..0]_{63..56} || 0^8
VR[vt]_{111..96}        ← mem[addr31..0]_{55..48} || 0^8
VR[vt]_{95..80}         ← mem[addr31..0]_{47..40} || 0^8
VR[vt]_{79..64}         ← mem[addr31..0]_{39..32} || 0^8
VR[vt]_{63..48}         ← mem[addr31..0]_{31..24} || 0^8
VR[vt]_{47..32}         ← mem[addr31..0]_{23..16} || 0^8
VR[vt]_{31..16}         ← mem[addr31..0]_{15..8}  || 0^8
VR[vt]_{15..0}          ← mem[addr31..0]_{7..0}   || 0^8
```

Where $0^n$ represents a string of n zeros and, ||, represents a concatenation function and, ||On, means that n zeros are concatenated onto the prior binary value. With reference to FIG. 5A, the operation of the LPV instruction is illustrated. Simultaneously, eight byte portions, a–h, of a quad word 102' of memory 102 are processed by logic 360 which concatenates eight zeros onto the data portion, as shown above. Each process 360 generates a 16-bit result. These 16-bit results are simultaneously loaded into eight respective short word data portions, a–h, of a vector register 120(n) indicated by vt.

Load Packed Unsigned to Vector Unit (LUV). In the LUV instruction of the present invention, the contents of the scalar register base are added to the offset (for this instruction, offset is defined to be increments of doublewords) to form the effective byte address, addr, in memory 102. Each byte the 8 consecutive bytes starting at the effective address in memory 102 is padded with a leading zero. The padded bytes are simultaneously loaded into the most significant byte of each halfword of vector register, vt. The least significant byte of each halfword of vector register, vt is zeroed. Alignment of data in memory 102 is on byte boundaries. Element is restricted to a value of 0, in this embodiment. LUV contains the following exemplary format: LUV vt[element], offset(base). In operation, the LUV instruction is executed according to the following procedure where all data is moved simultaneously:

```
addr31..0 ← SR[base] + (offset*8)
VR[vt]_{127..112}    ← 0 || mem[addr31..0]_{63..56} || 0^7
VR[vt]_{111..96}     ← 0 || mem[addr31..0]_{55..48} || 0^7
VR[vt]_{95..80}      ← 0 || mem[addr31..0]_{47..40} || 0^7
VR[vt]_{79..64}      ← 0 || mem[addr31..0]_{39..32} || 0^7
VR[vt]_{63..48}      ← 0 || mem[addr31..0]_{31..24} || 0^7
VR[vt]_{47..32}      ← 0 || mem[addr31..0]_{23..16} || 0^7
VR[vt]_{31..16}      ← 0 || mem[addr31..0]_{15..8}  || 0^7
VR[vt]_{15..0}       ← 0 || mem[addr31..0]_{7..0}   || 0^7
```

The operation of the LUV instruction is also illustrated in FIG. 5A where in this case the processes 360 each inserts the eight bits of the memory data (mem [addr 31..0])between a single zero and a string a seven zeros, as shown above. Simultaneously, eight byte portions, a–h, of a quad word 102' of memory 102 are processed by logic 360. Each process 360 generates a 16-bit result. These 16-bit results are simultaneously loaded into eight respective short word data portions, a–h, of a vector register 120(n), indicated by vt.

Load Sign Extended to Vector Unit (LXV). In the LXV instruction of the present invention, the contents of the scalar register base are added to the offset (for this instruction, offset is defined to be increments of doublewords) to form the effective byte address, addr, in memory 102. The 8 consecutive bytes starting at the effective address in memory 102, with each byte sign-extended to become a full 16-bit shortword element, are simultaneously loaded into each halfword of vector register, vt. Alignment of data in memory 102 is on byte boundaries.

Element is restricted to a value of 0, in this embodiment. LXV contains the following exemplary format: LXV vt[element], offset(base). In operation, the LXV instruction is executed according to the following procedure where all data is moved simultaneously:

```
addr31..0 ← SR[base] + (offset*8)
VR[vt]_{127..112}  ← (mem[addr31..0]_{63})^8 ∥ mem[addr31..0]_{63..56}
VR[vt]_{111..96}   ← (mem[addr31..0]_{55})^8 ∥ mem[addr31..0]_{55..48}
VR[vt]_{95..80}    ← (mem[addr31..0]_{47})^8 ∥ mem[addr31..0]_{47..40}
VR[vt]_{79..64}    ← (mem[addr31..0]_{39})^8 ∥ mem[addr31..0]_{39..32}
VR[vt]_{63..48}    ← (mem[addr31..0]_{31})^8 ∥ mem[addr31..0]_{31..24}
VR[vt]_{47..32}    ← (mem[addr31..0]_{23})^8 ∥ mem[addr31..0]_{23..16}
VR[vt]_{31..16}    ← (mem[addr31..0]_{15})^8 ∥ mem[addr31..0]_{15..8}
VR[vt]_{15..0}     ← (mem[addr31..0]_{7})^8 ∥ mem[addr31..0]_{7..0}
```

Where (expression)$^8$ indicates that the bit represented by the expression is repeated eight times.

The operation of the LXV instruction is also illustrated in claim FIG. 5A where in this case the processes 360 each take the high bit of the eight bit memory data and replicate this bit eight times and add to this the eight bits of the memory data. Simultaneously, eight byte portions, a–h, of a quad word 102' of memory 102 are processed by logic 360. Each process 360 generates a 16-bit result. These 16-bit results are simultaneously loaded into eight respective short word data portions, a–h, of a vector register 120(n), indicated by vt.

Load Zero Extended to Vector Unit (LZV). In the LZV instruction of the present invention, the contents of the scalar register base are added to the offset (for this instruction, offset is defined to be increments of doublewords) to form the effective byte address, addr, in memory 102. The eight consecutive bytes starting at the effective address in memory, with each byte zero-extended to become a full 16-bit shortword element, are simultaneously loaded into each halfword of vector register, vt. Alignment of data in memory 102 is on byte boundaries. Element is restricted to a value of 0, in this embodiment. LZV contains the following exemplary format: LZV vt[element], offset(base). In operation, the LZV instruction is executed according to the following procedure where all data is moved simultaneously:

```
addr31..0 ← SR[base] + (offset*8)
VR[vt]_{127..112}  ← (0)^8 ∥ mem[addr31..0]_{63..56}
VR[vt]_{111..96}   ← (0)^8 ∥ mem[addr31..0]_{55..48}
VR[vt]_{95..80}    ← (0)^8 ∥ mem[addr31..0]_{47..40}
VR[vt]_{79..64}    ← (0)^8 ∥ mem[addr31..0]_{39..32}
VR[vt]_{63..48}    ← (0)^8 ∥ mem[addr31..0]_{31..24}
VR[vt]_{47..32}    ← (0)^8 ∥ mem[addr31..0]_{23..16}
VR[vt]_{31..16}    ← (0)^8 ∥ mem[addr31..0]_{15..8}
VR[vt]_{15..0}     ← (0)^8 ∥ mem[addr31..0]_{7..0}
```

Where (expression)$^8$ indicates that the bit represented by the expression is repeated eight times.

The operation of the LZV instruction is also illustrated in FIG. 5A where in this case the processes 360 each take a string of eight zeros and add to this the eight bits of the memory data. Simultaneously, eight byte portions, a–h, of a quad word 102' of memory 102 are processed by logic 360. Each process 360 generates a 16-bit result. These 16-bit results are simultaneously loaded into eight respective short word data portions, a–h, of a vector register 120(n), indicated by vt.

GROUP I LOADS

Load Alternate Bytes to Vector Unit (LHV). The contents of the scalar register base are added to the offset (in this case, offset is defined to be increments of quad words) to form the effective byte addresses in memory 102. Each byte of the eight alternating bytes starting at the effective address in memory is padded with a leading zero. The padded bytes are simultaneously loaded into the most significant bits of each halfword of vector register, vt. The least significant bits of each halfword of vector register vt are zeroed. Alignment of data in memory 102 is restricted to the first or second bytes of a quad word boundary. The least significant bit of the effective address determines whether odd bytes or even bytes are loaded. Element is restricted to a value of zero in one embodiment. LHV contains the following exemplary format: LHV vt[element], offset(base). In operation, the LHV instruction is executed according to the following procedure where all data moves of a given condition occur simultaneously:

```
addr31..0 ← SR[base] + (offset*16)
if (addr0=0) then
  VR[vt]_{127..112}  ← (0) ∥ mem[addr31..0]_{127..120} ∥ (0)^7
  VR[vt]_{111..96}   ← (0) ∥ mem[addr31..0]_{111..104} ∥ (0)^7
  VR[vt]_{95..80}    ← (0) ∥ mem[addr31..0]_{95..88} ∥ (0)^7
  VR[vt]_{79..64}    ← (0) ∥ mem[addr31..0]_{79..72} ∥ (0)^7
  VR[vt]_{63..48}    ← (0) ∥ mem[addr31..0]_{63..56} ∥ (0)^7
  VR[vt]_{47..32}    ← (0) ∥ mem[addr31..0]_{47..40} ∥ (0)^7
  VR[vt]_{31..16}    ← (0) ∥ mem[addr31..0]_{31..24} ∥ (0)^7
  VR[vt]_{15..0}     ← (0) ∥ mem[addr31..0]_{15..8} ∥ (0)^7
else
  VR[vt]_{127..112}  ← (0) ∥ mem[addr31..0]_{119..112} ∥ (0)^7
  VR[vt]_{111..96}   ← (0) ∥ mem[addr31..0]_{103..96} ∥ (0)^7
  VR[vt]_{95..80}    ← (0) ∥ mem[addr31..0]_{87..80} ∥ (0)^7
  VR[vt]_{79..64}    ← (0) ∥ mem[addr31..0]_{71..64} ∥ (0)^7
  VR[vt]_{63..48}    ← (0) ∥ mem[addr31..0]_{55..48} ∥ (0)^7
  VR[vt]_{47..32}    ← (0) ∥ mem[addr31..0]_{39..32} ∥ (0)^7
  VR[vt]_{31..16}    ← (0) ∥ mem[addr31..0]_{23..16} ∥ (0)^7
  VR[vt]_{15..0}     ← (0) ∥ mem[addr31..0]_{7..0} ∥ (0)^7
```

Figure 5B:
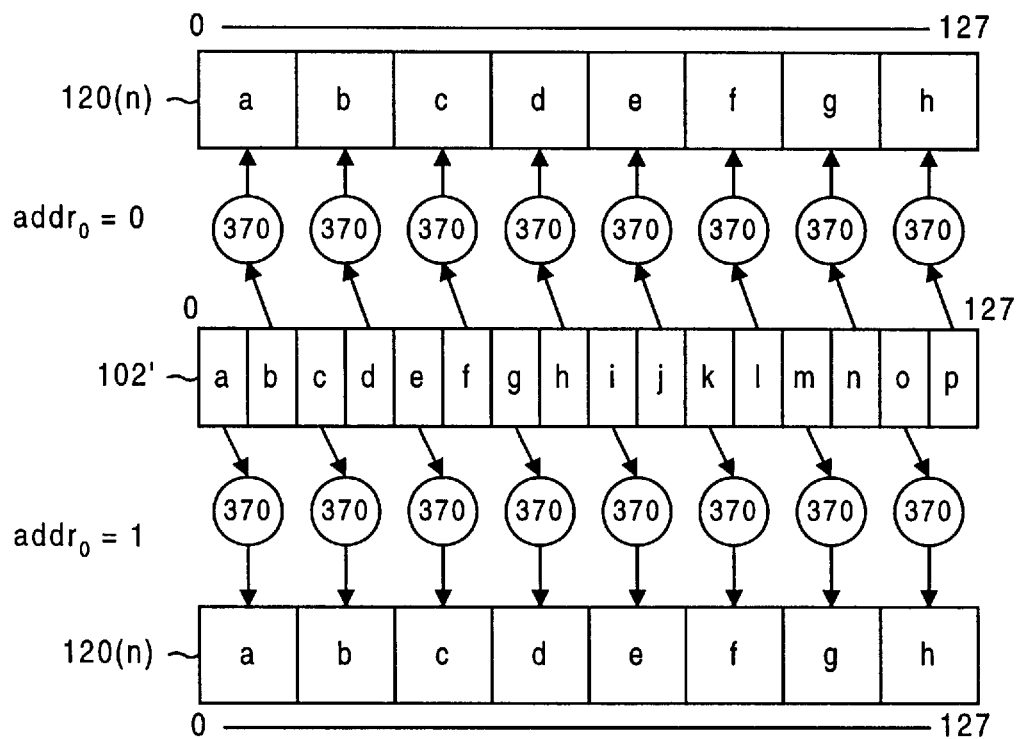
FIG. 5B illustrates a logical flow diagram for the LHV, LHLV, LHPV, and LHXV instructions of the present invention.

FIG. 5B illustrates the LHV instruction in operation. If addr0=0, then alternating byte portions b, d, f, h, j, l, n, and p of data quad word 102' of memory 102 are data type formatted by each of the processes 370 and the results are simultaneously loaded (through cross bar circuit 130) into 16-bit data portions a, b, c, d, e, f, g, and h of vector register 120(n) specified by vt.

If addr0=1, then alternating byte portions a, c, e, j, i, k, m, and o of data quad word 102' of memory 102 are data type formatted by each of the processes 370 and the results are simultaneously loaded (through cross bar circuit 130) into 16-bit data portions a, b, c, d, e, f, g, and h of vector register 120(n) specified by vt. In either case, each of the processes 370 format the data by placing the byte data between a single zero and a string of seven zeros, see above. Each of the processes 370 outputs a 16-bit result value.

Load Alternate Bytes Lower to Vector Unit (LHLV). In the LHLV instruction, the contents of the scalar register base are added to the offset (in this case, offset is defined to be increments of quad words) to form the effective byte addresses in memory 102. Each of the eight alternating bytes starting at the effective address in memory is simultaneously loaded into the least significant bits of each halfword of vector register, vt. The most significant bits of each halfword of vector register vt are zeroed. Alignment of data in memory is restricted to the first or second bytes of a quad word boundary. The least significant bit of the effective address determines whether odd bytes or event bytes are loaded Element is restricted to value of zero in one embodiment. LHLV contains the following exemplary format: LHLV vt[element], offset(base). In operation, the LHLV instruction is executed according to the following procedure with all data moves of a given condition performed simultaneously:

```
addr31..0 ← SR[base] + (offset*16)
if (addr0=0) then
    VR[vt]_{127..112}    ← (0)^8 || mem[addr31..0]_{127..120}
    VR[vt]_{111..96}     ← (0)^8 || mem[addr31..0]_{111..104}
    VR[vt]_{95..80}      ← (0)^8 || mem[addr31..0]_{95..88}
    VR[vt]_{79..64}      ← (0)^8 || mem[addr31..0]_{79..72}
    VR[vt]_{63..48}      ← (0)^8 || mem[addr31..0]_{63..56}
    VR[vt]_{47..32}      ← (0)^8 || mem[addr31..0]_{47..40}
    VR[vt]_{31..16}      ← (0)^8 || mem[addr31..0]_{31..24}
    VR[vt]_{15..0}       ← (0)^8 || mem[addr31..0]_{15..8}
else
    VR[vt]_{127..112}    ← (0)^8 || mem[addr31..0]_{119..112}
    VR[vt]_{111..96}     ← (0)^8 || mem[addr31..0]_{103..96}
    VR[vt]_{95..80}      ← (0)^8 || mem[addr31..0]_{87..80}
    VR[vt]_{79..64}      ← (0)^8 || mem[addr31..0]_{71..64}
    VR[vt]_{63..48}      ← (0)^8 || mem[addr31..0]_{55..48}
    VR[vt]_{47..32}      ← (0)^8 || mem[addr31..0]_{39..32}
    VR[vt]_{31..16}      ← (0)^8 || mem[addr31..0]_{23..16}
    VR[vt]_{15..0}       ← (0)^8 || mem[addr31..0]_{7..0}
```

Load Alternate Packed Signed to Vector Unit (LHPV). In the LHPV instruction, the contents of the scalar register base are added to the offset (in this case, offset is defined to be increments of quad words) to form the effective byte addresses in memory 102. Each of the eight alternating bytes starting at the effective address in memory is simultaneously loaded into the most significant bits of each halfword of vector register, vt. The least significant bits of each halfword of vector register vt are zeroed. Alignment of data in memory is restricted to the first or second bytes of a quad word boundary. The least significant bit of the effective address determines whether odd bytes or event bytes are loaded Element is restricted to value of zero in one embodiment. LHPV contains the following exemplary format: LHPV vt[element], offset(base). In operation, the LHPV instruction is executed according to the following procedure with all data moves of a given condition performed simultaneously:

```
addr31..0 ← SR[base] + (offset*16)
if (addr0=0) then
    VR[vt]_{127..112}    ← mem[addr31..0]_{127..120} || (0)^8
    VR[vt]_{111..96}     ← mem[addr31..0]_{111..104} || (0)^8
    VR[vt]_{95..80}      ← mem[addr31..0]_{95..88} || (0)^8
    VR[vt]_{79..64}      ← mem[addr31..0]_{79..72} || (0)^8
    VR[vt]_{63..48}      ← mem[addr31..0]_{63..56} || (0)^8
    VR[vt]_{47..32}      ← mem[addr31..0]_{47..40} || (0)^8
    VR[vt]_{31..16}      ← mem[addr31..0]_{31..24} || (0)^8
    VR[vt]_{15..0}       ← mem[addr31..0]_{15..8} || (0)^8
else
    VR[vt]_{127..112}    ← mem[addr31..0]_{119..112} || (0)^8
    VR[vt]_{111..96}     ← mem[addr31..0]_{103..96} || (0)^8
    VR[vt]_{95..80}      ← mem[addr31..0]_{87..80} || (0)^8
    VR[vt]_{79..64}      ← mem[addr31..0]_{71..64} || (0)^8
    VR[vt]_{63..48}      ← mem[addr31..0]_{55..48} || (0)^8
    VR[vt]_{47..32}      ← mem[addr31..0]_{39..32} || (0)^8
    VR[vt]_{31..16}      ← mem[addr31..0]_{23..16} || (0)^8
    VR[vt]_{15..0}       ← mem[addr31..0]_{7..0} || (0)^8
```

FIG. 5B also illustrates the LHLV and the LHPV instruction in operation where in this case process 370 performs a different data format. According to the LHLV and the LHPV instructions, if addr0=0, then alternating byte portions b, d, f, h, j, l, n, and p of data quad word 102' of memory 102 are data type formatted by each of the processes 370 and the results are simultaneously loaded (through cross bar circuit 130) into 16-bit data portions a, b, c, d, e, f, g, and h of vector register 120(n) specified by vt. If addr0=1, then alternating byte portions a, c, e, j, i, k, m, and o of data quad word 102' of memory 102 are data type formatted by each of the processes 370 and the results are simultaneously loaded (through cross bar circuit 130) into 16-bit data portions a, b, c, d, e, f, g, and h of vector register 120(n) specified by vt. In either case, each of the processes 370 format the data by combining a string of eight zeros and the byte data, as shown above for LHLV and LHPV. Each of the processes 370 outputs a 16-bit value.

Load Alternate Bytes Sign Extended to Vector Unit (LHXV). In the LHXV instruction, the contents of the scalar register base are added to the offset (in this case, offset is defined to be increments of quad words) to form the effective byte addresses in memory 102. Each of the eight alternating bytes starting at the effective address in memory is sign-extended to become a full 16-bit shortword element then loaded into each halfword of vector register vt. Alignment of data in memory is restricted to the first or second byte of a quad word boundary. The least significant bit of the effective address determines whether odd bytes or even bytes are loaded. LHXV contains the following exemplary format: LHXV vt[element], offset(base). In operation, the LHXV instruction is executed according to the following procedure where all data moves of a given condition are performed simultaneously:

```
addr31..0 ← SR[base] + (offset*16)
if (addr0=0) then
    VR[vt]_{127..112}    ← (mem[addr31...0]_{127})^8 || mem[addr31..0]_{127..120}
    VR[vt]_{111..96}     ← (mem[addr31..0]_{111})^8 || mem[addr31..0]_{111..104}
    VR[vt]_{95..80}      ← (mem[addr31..0]_{95})^8 || mem[addr31..0]_{95..88}
    VR[vt]_{79..64}      ← (mem[addr31..0]_{79})^8 || mem[addr31..0]_{79..72}
    VR[vt]_{63..48}      ← (mem[addr31..0]_{63})^8 || mem[addr31..0]_{63..56}
    VR[vt]_{47..32}      ← (mem[addr31..0]_{47})^8 || mem[addr31..0]_{47..40}
    VR[vt]_{31..16}      ← (mem[addr31..0]_{31})^8 || mem[addr31..0]_{31..24}
    VR[vt]_{15..0}       ← (mem[addr31..0]_{15})^8 || mem[addr31..0]_{15..8}
else
    VR[vt]_{127..112}    ← (mem[addr31..0]_{119})^8 || mem[addr31..0]_{119..112}
    VR[vt]_{111..96}     ← (mem[addr31..0]_{103})^8 || mem[addr31..0]_{103..96}
    VR[vt]_{95..80}      ← (mem[addr31..0]_{87})^8 || mem[addr31..0]_{87..80}
    VR[vt]_{79..64}      ← (mem[addr31..0]_{71})^8 || mem[addr31..0]_{71..64}
    VR[vt]_{63..48}      ← (mem[addr31..0]_{55})^8 || mem[addr31..0]_{55..48}
    VR[vt]_{47..32}      ← (mem[addr31..0]_{39})^8 || mem[addr31..0]_{39..32}
    VR[vt]_{31..16}      ← (mem[addr31..0]_{23})^8 || mem[addr31..0]_{23..16}
    VR[vt]_{15..0}       ← (mem[addr31..0]_{7})^8 || mem[addr31..0]_{7..0}
```

FIG. 5B also illustrates the LHXV instruction in operation where in this case process 370 performs a different data format. According to the LHXV instruction, if addr0=0, then alternating byte portions b, d, f, h, j, l, n, and p of data quad word 102' of memory 102 are data type formatted by each of the processes 370 and the results are simultaneously loaded (through cross bar circuit 130) into 16-bit data portions a, b, c, d, e, f, g, and h of vector register 120(n) specified by vt. If addr0=1, then alternating byte portions a, c, e, j, i, k, m, and o of data quad word 102' of memory 102 are data type formatted by each of the processes 370 and the results are simultaneously loaded (through cross bar circuit 130) into 16-bit data portions a, b, c, d, e, f, g, and h of vector register 120(n) specified by vt. In either case, each of the processes 370 format the data by replicating the high bit value of the data eight times and combining this replication with the byte data, see above. Each of the processes 370 outputs a 16-bit value.

Load Alternate Shortwords to Vector Unit (LAV). In the present invention LAV instruction, the contents of the scalar register, base, are added to the offset (for this instruction offset is defined to be increments of doublewords) to form the effective byte address, addr, in memory 102. The four alternating halfwords (16 bits each) starting at the effective address, addr, in memory 102 are loaded into all the bits of the halfwords of vector register, vt, of the register file 204, as specified by the element value. Alignment of data in memory 102 is restricted to the zero or second byte of a quad-word boundary. If the effective address is not halfword aligned, an addressing exception can occur. In one implementation, the element value is restricted to values of 0 or 8. LAV contains the following exemplary format: LAV vt[element], offset(base). Each of the four moves performed by the LAV instruction are performed simultaneously through the cross bar circuit 130.

In operation, the LAV instruction is executed according to the following procedure where all data moves of a given condition are performed simultaneously:

```
addr31..0 ← SR[base] + (offset *8)
b ← addr1..addr0
e ← element
if (b=2) then
    VR[vt]_{8*e+63..8*e+48}    ← mem[addr31..0]_{111..96}
    VR[vt]_{8*e+47..8*e+32}    ← mem[addr31..0]_{79..64}
    VR[vt]_{8*e+31..8*e+16}    ← mem[addr31..0]_{47..32}
    VR[vt]_{8*e+15..8*e}       ← mem[addr31..0]_{15..0}
if (b=0) then
    VR[vt]_{8*e+63..8*48}      ← mem[addr31..0]_{127..112}
    VR[vt]_{8*e+47..8*32}      ← mem[addr31..0]_{95..80}
    VR[vt]_{8*e+31..8*16}      ← mem[addr31..0]_{63..48}
    VR[vt]_{8*e+15..8*e}       ← mem[addr31..0]_{31..16}
``` where addr1 is the first bit of address addr, addr0 is the zero bit of addr, VR[vt] is the vector register number (of the vector register file 204) indicated by vt and subscripted values indicate the particular bits of the identified value involved in the data move.

FIG. 4A illustrates the method executed according to instruction LAV. If b=0 and e=0, then alternating halfwords (a), (c), (e) and (g) of memory portion 102' are moved simultaneously through crossbar circuit 130 to the most significant bits of halfwords (a), (c), (e) and (g) of vector register 120(n) indicated by vt. If b=2 and e=0 then alternating halfwords (b), (d), (g) and (h) of memory portion 102' are moved simultaneously through crossbar circuit 130 to the most significant bits of halfwords (a), (c), (e) and (g) of vector register 120(n) indicated by vt. Two alternate transfers can occur when e=8 and these are analogous to the above two transfers, however, halfwords (b), (d), (f) and (h) of vector register 120(n) are used instead of halfwords (a), (c), (e) and (g).

Load Fourths to Vector Unit (LFV). In the LFV instruction the contents of the scalar register base are added to the offset (in this case, offset is defined to be increments of quad words) to form the effective byte addresses in memory 102. The every fourth byte (4 bytes total) starting at the effective address in memory, addr, is padded with a leading zero. The padded bytes are loaded into the most significant bits of each halfword of vector register, vt as specified by element. The least significant bits of each halfword of vector register vt are zeroed. Element is restricted to values of 0 or 8 in one embodiment. Alignment of data in memory 102 is restricted to the first, second, or third byte of a quad word boundary. LFV contains the following exemplary format: LFV vt[element], offset(base). In operation, the LFV instruction is executed according to the following procedure where data moves of a given condition are performed simultaneously:

```
addr31..0 ← SR[base] + (offset*16)
e ← element
b ← addr1..addr0
if (b=3) then
    VR[vt]_{8*e+63..8*e+48}    ← 0 || mem[addr31..0]_{103..96} ||0^7
    VR[vt]_{8*e+47..8*e+32}    ← 0 || mem[addr31..0]_{71..64}  ||0^7
    VR[vt]_{8*e+31..8*e+16}    ← 0 || mem[addr31..0]_{39..32}  ||0^7
    VR[vt]_{8*e+15..8*e}       ← 0 || mem[addr31..0]_{7..0}    ||0^7
else if (b=2) then
    VR[vt]_{8*e+63..8*e+48}    ← 0 || mem[addr31..0]_{111..104} ||0^7
    VR[vt]_{8*e+47..8*e+32}    ← 0 || mem[addr31..0]_{79..72}   ||0^7
    VR[vt]_{8*e+31..8*e+16}    ← 0 || mem[addr31..0]_{47..40}   ||0^7
    VR[vt]_{8*e+15..8*e}       ← 0 || mem[addr31..0]_{15..8}    ||0^7
else if (b=1) then
    VR[vt]_{8*e+63..8*e+48}    ← 0 || mem[addr31..0]_{119..112} ||0^7
    VR[vt]_{8*e+47..8*e+32}    ← 0 || mem[addr31..0]_{87..80}   ||0^7
    VR[vt]_{8*e+31..8*e+16}    ← 0 || mem[addr31..0]_{55..48}   ||0^7
    VR[vt]_{8*e+15..8*e}       ← 0 || mem[addr31..0]_{23..16}   ||0^7
else if (b=0) then
    VR[vt]_{8*e+63..8*e+48}    ← 0 || mem[addr31..0]_{127..120} ||0^7
    VR[vt]_{8*e+47..8*e+32}    ← 0 || mem[addr31..0]_{95..88}   ||0^7
    VR[vt]_{8*e+31..8*e+16}    ← 0 || mem[addr31..0]_{63..56}   ||0^7
    VR[vt]_{8*e+15..8*e}       ← 0 || mem[addr31..0]_{31..24}   ||0^7
```

Figure 5C:
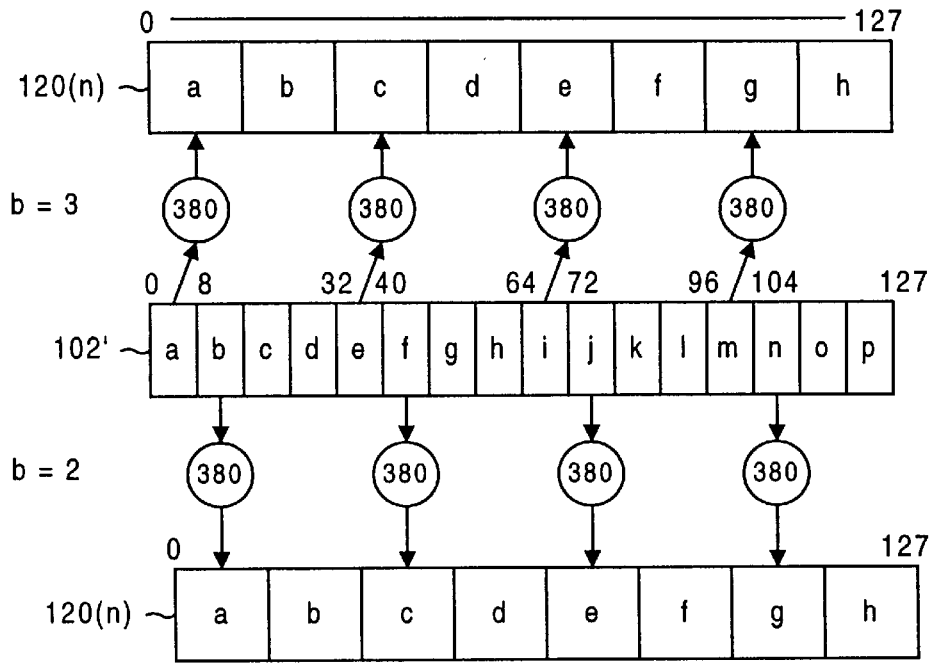
FIG. 5C illustrates a logical flow diagram for the LFV, LFLV, LFPV, and LFXV instructions of the present invention.
Figure 5C:
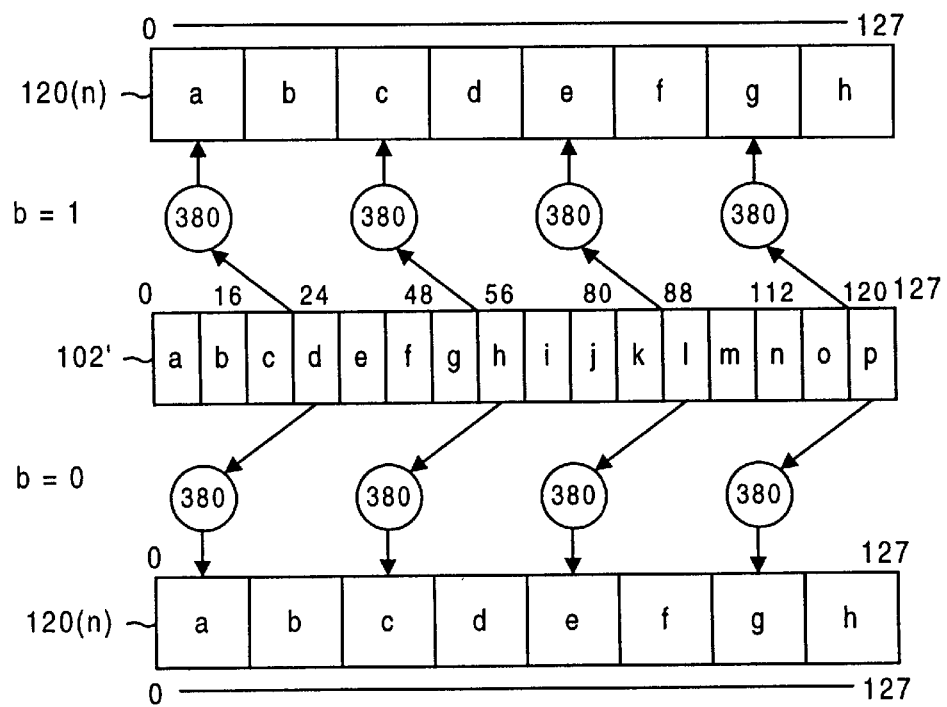

FIG. 5C illustrates the operation of the LFV instruction. According to this instruction, if e=0 and b=3, then every fourth byte defined by bytes a, e, i, and m from a quad word 102' of memory 102 are loaded into processes 380 which perform data formatting and the 16-bit result from each is simultaneously loaded (through cross bar circuit 130) into 16-bit portions a, c, e, and g of vector register 120(n) specified by vt. If e=0 and b=2, then every fourth byte defined by bytes b, f, j, and n from a quad word 102' of memory 102 are loaded into processes 380 which perform data formatting and the 16-bit result from each is simultaneously loaded (through cross bar circuit 130) into 16-bit portions a, c, e, and g of vector register 120(n). If e=0 and b=1, then every fourth byte defined by bytes c, g, k, and o from a quad word 102' of memory 102 are loaded into processes 380 which perform data formatting and the 16-bit result from each is simultaneously loaded (through cross bar circuit 130) into 16-bit portions a, c, e, and g of vector register 120(n). If e=0 and b=0, then every fourth byte defined by bytes d, h, l, and p from a quad word 102' of memory 102 are loaded into processes 380 which perform data formatting and the 16-bit result from each is simultaneously loaded (through cross bar circuit 130) into 16-bit portions a, c, e, and g of vector register 120(n). If e=8 then the above four transfers are possible, but 16-bit portions b, d, f, and h of vector register 120(n) are used in lieu of 16-bit portions a, c, e, and g. With reference to FIG. 5C, each of the processes 380 perform the following data type formatting: the byte data from memory 102' is stored between one zero and a string of seven zeros (see above) to form a 16-bit result value. Load Fourths Lower to Vector Unit (LFLV). In the LFLV instruction, the contents of the scalar register base are added to the offset (in this case, offset is defined to be increments of quad words) to form the effective byte addresses in memory 102. Every fourth byte (4 bytes total) starting at the effective address, addr, in memory 102 are loaded into the least significant bits of each halfword of vector register, vt, as specified by element. The most significant bits of each halfword of vector register vt are zeroed. Element is restricted to values of 0 or 8 in one embodiment. Alignment of data in memory 102 is restricted to the first, second, or third byte of a quad word boundary. LFLV contains the following exemplary format: LFLV vt[element], offset(base). In operation, the LFLV instruction is executed according to the following procedure where data moves of a given condition are performed simultaneously:

```
addr31..0 ← SR[base] + (offset*16)
e ← element
b ← addr1..addr0
if (b=3) then
  VR[vt]_{8*e+63..8*e+48}   <-- 0^8 || mem[addr31..0]_{103..96}
  VR[vt]_{8*e+47..8*e+32}   <-- 0^8 || mem[addr31..0]_{71..64}
  VR[vt]_{8*e+31..8*e+16}   <-- 0^8 || mem[addr31..0]_{39..32}
  VR[vt]_{8*e+15..8*e}      <-- 0^8 || mem[addr31..0]_{7..0}
else if (b=2) then
  VR[vt]_{8*e+63..8*e+48}   <-- 0^8 || mem[addr31..0]_{111..104}
  VR[vt]_{8*e+47..8*e+32}   <-- 0^8 || mem[addr31..0]_{79..72}
  VR[vt]_{8*e+31..8*e+16}   <-- 0^8 || mem[addr31..0]_{47..40}
  VR[vt]_{8*e+15..8*e}      <-- 0^8 || mem[addr31..0]_{15..8}
else if (b=1) then
  VR[vt]_{8*e+63..8*e+48}   <-- 0^8 || mem[addr31..0]_{119..112}
  VR[vt]_{8*e+47..8*e+32}   <-- 0^8 || mem[addr31..0]_{87..80}
  VR[vt]_{8*e+31..8*e+16}   <-- 0^8 || mem[addr31..0]_{55..48}
  VR[vt]_{8*e+15..8*e}      <-- 0^8 || mem[addr31..0]_{23..16}
else if (b=0) then
  VR[vt]_{8*e+63..8*e+48}   <-- 0^8 || mem[addr31..0]_{127..120}
  VR[vt]_{8*e+47..8*e+32}   <-- 0^8 || mem[addr31..0]_{95..88}
  VR[vt]_{8*e+31..8*e+16}   <-- 0^8 || mem[addr31..0]_{63..56}
  VR[vt]_{8*e+15..8*e}      <-- 0^8 || mem[addr31..0]_{31..24}
```

Load Fourths Lower to Vector Unit (LFPV). In the LFPV instruction, the contents of the scalar register base are added to the offset (in this case, offset is defined to be increments of quad words) to form the effective byte addresses in memory 102. Every fourth byte (4 bytes total) starting at the effective address, addr, in memory 102 are loaded into the most significant bits of each halfword of vector register, vt, as specified by element. The least significant bits of each halfword of vector register vt are zeroed. Element is restricted to values of 0 or 8 in one embodiment. Alignment of data in memory 102 is restricted to the first, second, or third byte of a quad word boundary. LFPV contains the following exemplary format: LFPV vt[element], offset (base). In operation, the LFPV instruction is executed according to the following procedure where data moves of a given condition are performed simultaneously:

```
addr31..0 ← SR[base] + (offset*16)
e ← element
b ← addr1..addr0
if (b=3) then
  VR[vt]_{8*e+63..8*e+48}   <-- mem[addr31..0]_{103..96} || 0^8
  VR[vt]_{8*e+47..8*e+32}   <-- mem[addr31..0]_{71..64} || 0^8
  VR[vt]_{8*e+31..8*e+16}   <-- mem[addr31..0]_{39..32} || 0^8
  VR[vt]_{8*e+15..8*e}      <-- mem[addr31..0]_{7..0} || 0^8
else if (b=2) then
  VR[vt]_{8*e+63..8*e+48}   <-- mem[addr31..0]_{111..104} || 0^8
  VR[vt]_{8*e+47..8*e+32}   <-- mem[addr31..0]_{79..72} || 0^8
  VR[vt]_{8*e+31..8*e+16}   <-- mem[addr31..0]_{47..40} || 0^8
  VR[vt]_{8*e+15..8*e}      <-- mem[addr31..0]_{15..8} || 0^8
else if (b=1) then
  VR[vt]_{8*e+63..8*e+48}   <-- mem[addr31..0]_{119..112} || 0^8
  VR[vt]_{8*e+47..8*e+32}   <-- mem[addr31..0]_{87..80} || 0^8
  VR[vt]_{8*e+31..8*e+16}   <-- mem[addr31..0]_{55..48} || 0^8
  VR[vt]_{8*e+15..8*e}      <-- mem[addr31..0]_{23..16} || 0^8
else if (b=0) then
  VR[vt]_{8*e+63..8*e+48}   <-- mem[addr31..0]_{127..120} || 0^8
  VR[vt]_{8*e+47..8*e+32}   <-- mem[addr31..0]_{95..88} || 0^8
  VR[vt]_{8*e+31..8*e+16}   <-- mem[addr31..0]_{63..56} || 0^8
  VR[vt]_{8*e+15..8*e}      <-- mem[addr31..0]_{31..24} || 0^8
```

FIG. 5C also illustrates the operation of the LFLV and LFPV instructions for b=3, b=2, b=1 and b=0 (for e=0). If e=8 then the above four transfers are possible, but 16-bit portions b, d, f, and h of vector register 120(n) are used in lieu of 16-bit portions a, c, e, and g. With reference to FIG. 5C and LFLV instruction, each of the processes 380 perform the following data type formatting: a string of eight zeros is concatenated with the byte data from memory 102', see above, to form the 16-bit values output from each of the processes 380. With reference to FIG. 5C and LFPV instruction, each of the processes 380 perform the following data type formatting: the byte data from memory 102' is concatenated with a string of eight zeros, see above, to form the 16-bit values output from each of the processes 380.

Load Fourths Sign Extended to Vector Unit (LFXV). In the LFXV instruction, the contents of the scalar register base are added to the offset (in this case, offset is defined to be increments of quad words) to form the effective byte addresses in memory 102. The every fourth byte (4 bytes total) starting at the effective address, addr, in memory 102 is sign extended to become a full 16-bit shortword element then loaded into each halfword of vector register vt as specified by element. Element is restricted to values of 0 or 8 in one embodiment. Alignment of data in memory 102 is restricted to the first, second, or third byte of a quad word boundary.

LFXV contains the following exemplary format: LFXV vt[element], offset(base). In operation, the LFXV instruction is executed according to the following procedure where data moves of a given condition are performed simultaneously:

```
addr31 ... 0 <- SR[base] + (offset*16)
e <- element
b <- addr1 ... addr0
if (b=3) then
  VR[vt]8*e+63 ... 8*e+48   <-- mem[addr31 ... 0]103^8 || mem[addr31 ... 0]103 ... 96
  VR[vt]8*e+47 ... 8*e+32   <-- mem[addr31 ... 0]71^8 || mem[addr31 ... 0]71 ... 64
  VR[vt]8*e+31 ... 8*e+16   <-- mem[addr31 ... 0]39^8 || mem[addr31 ... 0]39 ... 32
  VR[vt]8*e+15 ... 8*e      <-- mem[addr31 ... 0]7^8 || mem[addr31 ... 0]7 ... 0
else if (b=2) then
  VR[vt]8*e+63 ... 8*e+48   <-- mem[addr31 ... 0]111^8 || mem[addr31 ... 0]111 ... 104
  VR[vt]8*e+47 ... 8*e+32   <-- mem[addr31 ... 0]79^8 || mem[addr31 ... 0]79 ... 72
  VR[vt]8*e+31 ... 8*e+16   <-- mem[addr31 ... 0]47^8 || mem[addr31 ... 0]47 ... 40
  VR[vt]8*e+15 ... 8*e      <-- mem[addr31 ... 0]15^8 || mem[addr31 ... 0]15 ... 8
else if(b=1)then
  VR[vt]8*e+63 ... 8*e+48   <-- mem[addr31 ... 0]119^8 || mem[addr31 ... 0]119 ... 112
  VR[vt]8*e+47 ... 8*e+32   <-- mem[addr31 ... 0]87^8 || mem[addr31 ... 0]87 ... 80
```

-continued

```
VR[vt]8*e+31 ... 8*e+16    <-- mem[addr31 ... 0]55⁸ || mem[addr31 ... 0]55 ... 48
VR[vt]8*e+15 ... 8*e       <-- mem[addr31 ... 0]23⁸ || mem[addr31 ... 0]23 ... 16
else if (b=0) then
VR[vt]8*e+63 ... 8*e+48    <-- mem[addr31 ... 0]127⁸ || mem[addr31 ... 0]127 ... 120
VR[vt]8*e+47 ... 8*e+32    <-- mem[addr31 ... 0]95⁸ || mem[addr31 ... 0]95 ... 88
VR[vt]8*e+31 ... 8*e+16    <-- mem[addr31 ... 0]63⁸ || mem[addr31 ... 0]63 ... 56
VR[vt]8*e+15 ... 8*e       <-- mem[addr31 ... 0]31⁸ || mem[addr31 ... 0]31 ... 24
```

FIG. 5C also illustrates the operation of the LFXV instruction for b=3, b=2, b=1 and b=0 (for e=0). If e=8 then the above four transfers are possible, but 16-bit portions b, d, f, and h of vector register 120(n) are used in lieu of 16-bit portions a, c, e, and g. With reference to FIG. 5C and LFXV instruction, each of the processes 380 perform the following data type formatting: the high bit of the each data byte is replicated eight times and this string of replicated bits is concatenated with the byte data from memory 102', see above, to form the 16-bit values output from each of the processes 380.

GROUP IV LOADS

The Group IV load instructions process data that spans a 128-bit boundary. They offer a very effective mechanism for loading the boundary crossing data using only two generalized instructions, an LQV followed by a back-to-back executed LRV instruction, and at most two clock cycles are consumed. The LQV and LRV instruction identifies the same vector register for receiving the data. In cases where the data happens to be aligned along a 128 bit boundary, the data is moved in only one cycle, using the LQV instruction only. In the prior art, generally only byte loads could be used to load this type of boundary crossing data. Therefore, this pair of instructions allows a two-cycle load to occur on a 128-bit byte aligned data value out of memory 102 that is itself aligned at 128-bit boundaries. Group IV loads are particularly useful for loading data segments that store graphics information for display.

Load Quad Word to Vector Unit (LQV). In the present invention LQV instruction, the contents of the scalar register, base, are added to the offset (for this instruction, offset is defined to be increments of quad words), to form the effective address, addr, in memory 102. The quad word at the effective address in memory is loaded into the doubleword of vector register, vt as specified by the element value. Alignment of data in memory 102 is on byte boundaries. LQV contains the following exemplary format: LQV vt[element], offset(base). In one embodiment, element is restricted to 0. If the effective address, addr, in memory 102 is not quad word aligned then bytes to be loaded are contained in the doubleword beyond the two doublewords addressed by the current instruction, therefore, the quad word is truncated and only that portion contained in the accessed memory doublewords is loaded into vector register, vt. The remaining bytes then can be retrieved using an LRV instruction. In operation, the LQV instruction is executed according to the following procedure:

```
addr31 ... 0 <- SR[base] + (offset *16)
b <- addr3 ... addr0
if (b=7) then
    VR[vt]127 ... 56    <- mem[addr31 ... 0]71 ... 0
else if (b=6) then
    VR[vt]127 ... 48    <- mem[addr31 ... 0]79 ... 0
else if (b=5) then
```

-continued

```
    VR[vt]127 ... 40    <- mem[addr31 ... 0]87 ... 0
else if (b=4) then
    VR[vt]127 ... 32    <- mem[addr31 ... 0]95 ... 0
else if (b=3) then
    VR[vt]127 ... 24    <- mem[addr31 ... 0]103 ... 0
else if (b=2) then
    VR[vt]127 ... 16    <- mem[addr31 ... 0]111 ... 0
else if (b=1) then
    VR[vt]127 ... 8     <- mem[addr31 ... 0]119 ... 0
else then
    VR[vt]127 ... 0     <- mem[addr31 ... 0]127 ... 0
```

Figure 3:
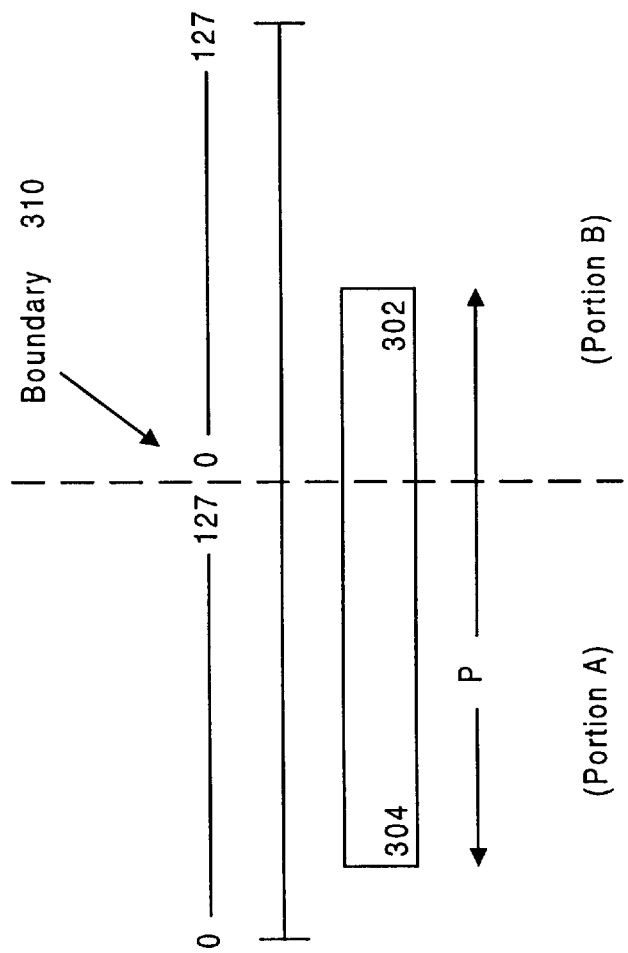
FIG. 3 is a logical illustration of a data portion crossing a 128 bit boundary relevant for the group IV load instructions.

With reference to FIG. 3, a data segment having segments 304 and 302 is shown crossing a quad word boundary 310 between a portion A and a portion B with 302 in boundary portion B and 304 in boundary portion A. In one embodiment, the data segment contains graphics information for display on screen 105. Portion 304 and 302 comprise a P-bit data (e.g., a 128-bit data). The instruction LQV is used to access portion 304 and store this portion into a vector register of the vector register file 204. It is appreciated that portion A and portion B can belong to different "tiles" in memory and therefore can be discontiguous in memory 102. The LRV instruction (discussed below) is used to access portion B and store it into the portion of the vector register of the vector register file 204 not used by the preceding LQV instruction.

Figure 4F:
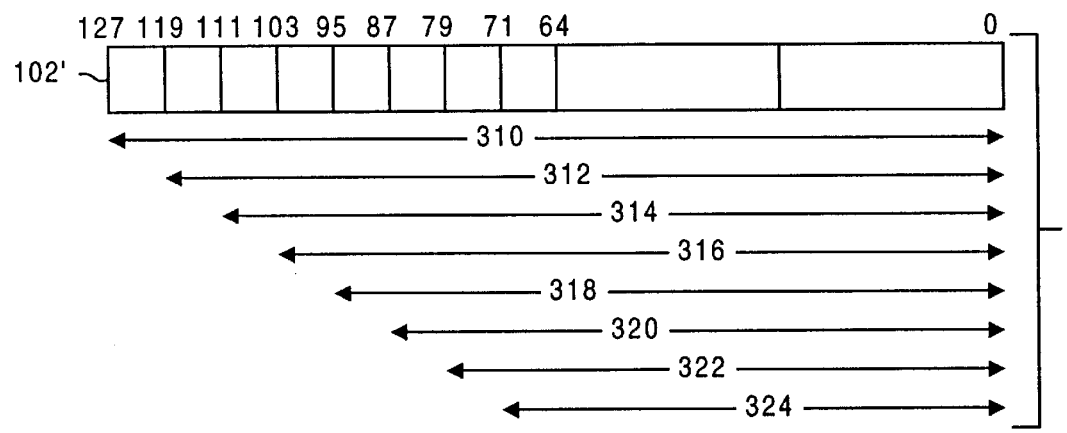
FIG. 4F illustrates a logical flow diagram for the LQV instruction of the present invention.
Figure 4F:
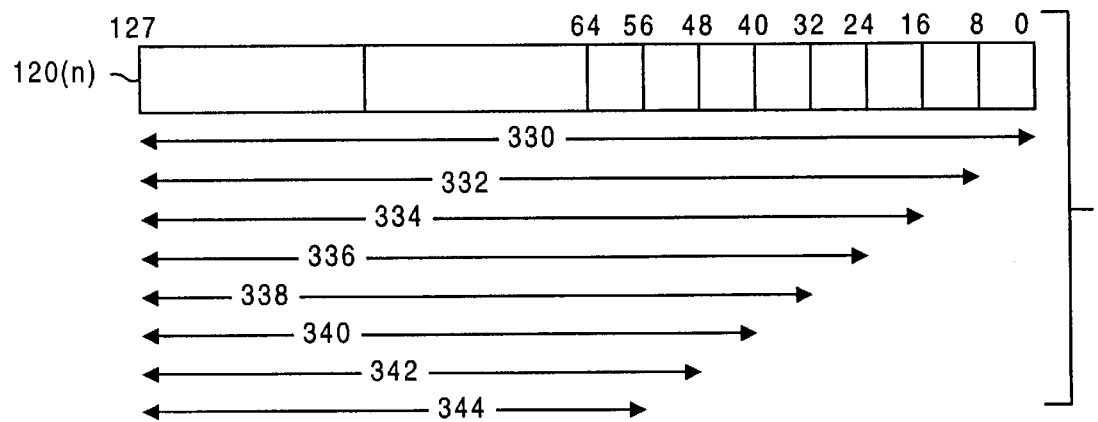

With reference to FIG. 4F, the operation of the LQV instruction is shown. A quad word 102' of memory 102 is shown. Data can reside within the quad word at the effective address, addr, or shifted by 1, 2, 3, 4, 5, 6, or 7 byte positions. If the last three bits of addr of the data are not zero, then the data does not begin at a double word boundary. If the last three bits of addr of the data are "1", then b=1 and the data occupies bits covered by dimension 312. If these bits are "2", then b=2 and the data resides in dimension 314. If these bits are "3", then b=3 and the data resides in dimension 316. If these bits are "4", then b=4 and the data resides in dimension 318. If these bits are "5", then b=5 and the data resides in dimension 320. If these bits are "6", then b=6 and the data resides in dimension 322. If these bits are "7", then b=7 and the data resides in dimension 334. Depending on the location of the data within 102', it is stored at different positions within the vector register 120(n) by the LQV instruction. For instance, if the data is in dimensions 310, 312, 314, 316, 318, 320, 322, or 324 the LQV instruction stores the data in dimensions 330, 332, 334, 336, 338, 340, 342, or 344, respectively, of a vector register 120(n) of the vector register file 204. It is appreciated that the LQV instruction is typically followed by an LRV instruction to complete the 128-bit data load in at most two cycles. It is appreciated that if the last three bits of addr are zero, then the data is quadword aligned and a single LQV instruction is enough to perform the data load and a subsequent LRV instruction is not needed in this case and is therefore not performed. In this case, the 128-bit data is loaded in one cycle.

Load Rest to Vector Unit (LRV). In the present invention LRV instruction, the contents of the scalar register base are added to the offset (for this instruction, offset is defined to be increments of quadwords), to form the effective address, addr, in memory 102. The quadword at the effective address, addr, in memory 102 is loaded into vector register vt. Alignment of data is memory 102 is on a byte boundary. If the effective address, addr, in memory 102 is quadword aligned, then no data is loaded. If the effective address, addr, in memory 102 is not quadword aligned, bytes are loaded from the quadword addressed, upon to the effective byte address. The bytes are loaded into the low-order bits of vector register vt. This instruction is intended to be used with LQV to load the remaining bytes of a quadword when the data in memory 102 is not quadword aligned. In effect, the instruction LRV is used to access the portion 302 of the P-bit data that crosses the quad word boundary 310. LRV contains the following exemplary format: LRV vt[element], offset (base). In operation, the LQV instruction is executed according to the following procedure:

```
addr31 ... 0 <-- SR[base] + (offset*16)
b <-- addr3 ... addr0
if (b=15) then
    VR[vt]119 ... 0 <-- mem[addr31 ... 4||0000]127 ... 8
else if (b=14) then
    VR[vt]111 ... 0 <-- mem[addr31 ... 4||0000]127 ... 16
else if (b=13) then
    VR[vt]103 ... 0 <-- mem[addr31 ... 4||0000]127 ... 24
else if (b=12) then
    VR[vt]95 ... 0 <-- mem[addr31 ... 4||0000]127 ... 32
else if(b=11) then
    VR[vt]87 ... 0 <-- mem[addr31 ... 4||0000]127 ... 40
else if (b=10) then
    VR[vt]79 ... 0 <-- mem[addr31 ... 4||0000]127 ... 48
else if (b=9) then
    VR[vt]71 ... 0 <-- mem[addr31 ... 4||0000]127 ... 56
else if (b=8) then
    VR[vt]63 ... 0 <-- mem[addr31 ... 4||0000]127 ... 64
else if (b=7) then
    VR[vt]55 ... 0 <-- mem[addr31 ... 4||0000]127 ... 72
else if (b=6) then
    VR[vt]47 ... 0 <-- mem[addr31 ... 4||0000]127. .80
else if (b=5) then
    VR[vt]39 ... 0 <-- mem[addr31 ... 4||0000]127 ... 88
else if (b=4) then
    VR[vt]31 ... 0 <-- mem[addr31 ... 4||0000]127 ... 96
else if (b=3) then
    VR[vt]23 ... 0 <-- mem[addr31 ... 4||0000]127 ... 104
else if (b=2) then
    VR[vt]15 ... 0 <-- mem[addr31 ... 4||0000]127 ... 112
else if (b=1) then
    VR[vt]7 ... 0 <-- mem[addr31 ... 4||0000]127 ... 120
```

With reference to FIG. 3, as discussed above, the LVR instruction is used to load portion 302 of the 128-bit data word comprising portion 302 and 304 into a vector register specified by the instruction format. According to the above procedure, depending on where the data portion B is stored in memory 102, it will be loaded into a different portion of the vector register file. When used in combination with an LVR instruction, the portion of the vector register not used by the LQV instruction is used by the LVR instruction. When used as a pair, the LQV, LRV instructions load a 128-bit data word into a single vector register that is commonly specified by the instruction pair in at most two cycles.

STORE INSTRUCTIONS

The operation of store instructions of the present invention is analogous to the load instructions described above except that the flow of data is from the vector register file 204 to the memory 102. For this reason, a condensed discussion of these store instructions is presented below. The data item in the vector register specified by vt and starting at the element specified by element is loaded into memory 102, starting at the effective byte address, addr. Memory accesses to the data RAM 102 are double-word aligned. A write to the data RAM can access 1 or 2 double-word elements. Any data write that modifies less than a quad-word of data writes all the data in memory 102. In some cases where the data size is quad-word, the combination of the byte address and item size can cause some portion of the data to be written in the next higher double word in memory than that addressed by address+8. In this case, only the portion of the data that fit in the currently accessed memory double words is written. The remaining data that is not written can be stored with a second instruction using the Store Rest instruction. The element field specifies the alignment for reading the data from the vector register. For byte stores, the element field can be any number between 0 and 15. For larger data items, the element field is restricted to values that result in all the data to be moved being read from the vector register specified by vt. The store instructions are presented below.

Store Byte From Vector Unit (SBV). Format SBV vt[element], offset(base). The byte of vector register vt, as specified by element, is stored into the byte in memory 102 at the effective byte address. In operation this instruction performs:

```
addr31 ... 0 <- SR[base] + offset
e <- element
mem[addr31 ... 0]7 ... 0 <- VR[vt]8*e+7 ... 8*e
```

Store Shortword From Vector Unit (SSV). Format SSV vt[element], offset(base). The halfword of vector register vt, as specified by element, is stored into the halfword in memory at the effective address, addr. In operation this instruction performs:

```
addr31 ... 0 <- SR[base] + (offset *2)
e <- element
mem[addr31 ... 0]15 ... 0 <- VR[vt]8*e+15 ... 8*e
```

Store Longword From Vector Unit (SLV). Format SLV vt[element], offset(base). The longword of vector register vt, as specified by element, is stored into the longword in memory at the effective address, addr. In operation this instruction performs:

```
addr31 ... 0 <- SR[base] + (offset *4)
e <- element
mem[addr31 ... 0]31 ... 0 <- VR[vt]8*e+31 ... 8*e
```

Store Doubleword From Vector Unit (SDV). Format SDV vt[element], offset(base). The doubleword of vector register, vt, as specified by element, is stored into the doubleword in memory at the effective address, addr. In operation this instruction performs:

```
addr31 ... 0 <- SR[base] + (offset *8)
e <- element
mem[addr31 ... 0]63 ... 0 <- VR[vt]8*e+63 ... 8*e
```

Store Quad word From Vector Unit (SQV). Format SQV vt[element], offset(base). The vector register vt is stored into the quad word in memory at the effective address, addr. In operation this instruction performs:

```
addr31 . . . 0 <- SR[base] + (offset *16)
b <- addr2 . . . addr0
if (b=7) then
    mem[addr31 . . . 0]71 . . . 0         <- VR[vt]127 . . . 56
else if (b=6) then
    mem[addr31 . . . 0]79 . . . 0         <- VR[vt]127 . . . 48
else if (b=5) then
    mem[addr31 . . . 0]87 . . . 0         <- VR[vt]127 . . . 40
else if (b=4) then
    mem[addr31 . . . 0]95 . . . 0         <- VR[vt]127 . . . 32
else if (b=3) then
    mem[addr31 . . . 0]103 . . . 0        <- VR[vt]127 . . . 24
else if (b=2) then
    mem[addr31 . . . 0]111 . . . 0        <- VR[vt]127 . . . 16
else if (b=1) then
    mem[addr31 . . . 0]119 . . . 0        <- VR[vt]127 . . . 8
else
    mem[addr31 . . . 0]127 . . . 0        <- VR[vt]127 . . . 0
```

Store Rest From Vector Unit (SRV). Format SRV vt[element], offset(base). The vector register vt is stored into the quadword in memory 102 at the effective address, addr. In operation this instruction performs:

```
addr31..0 <-- SR[base] + (offset* 16)
b <-- addr3..addr0
if(b=15) then
    mem[addr31..4||0000]127..8  <-- VR[vt]119..0
else if (b=14) then
    mem[addr31..4||0000]127..16 <-- VR[vt]111..0
else if (b=13) then
    mem[addr31..4||0000]127..24 <-- VR[vt]103..0
else if (b=12) then
    mem[addr31..4||0000]127..32 <-- VR[vt]95..0
else if (b=11) then
    mem[addr31..4||0000]127..40 <-- VR[vt]87..0
else if (b=10) then
    mem[addr31..4||0000]127..48 <-- VR[vt]79..0
else if (b=9) then
    mem[addr31..4||0000]127..56 <-- VR[vt]71..0
else if (b=8) then
    mem[addr31..4||0000]127..64 <-- VR[vt]63..0
else if (b=7) then
    mem[addr31..4||0000]127..72 <-- VR[vt]55..0
else if (b=6) then
    mem[addr31..4||0000]127..80 <-- VR[vt]47..0
else if (b=5) then
    mem[addr31..4||0000]127..88 <-- VR[vt]39..0
else if (b=4) then
    mem[addr31..4||0000]127..96 <-- VR[vt]31..0
else if (b=3) then
    mem[addr31..4||0000]127..104 <-- VR[vt]23..0
else if (b=2) then
    mem[addr31..4||0000]127..112 <-- VR[vt]15..0
else if (b=1) then
    mem[addr31..4||0000]127..120 <-- VR[vt]7..0
```

Store Pack Signed From Vector Unit (SPV). Format SPV vt[element], offset(base). The most significant bytes of each halfword of vector register vt are simultaneously stored into eight consecutive bytes in memory, starting at the effective address, addr. In operation this instruction performs where data moves are performed simultaneously:

```
addr31..0 <- SR[base] + (offset*8)
mem[addr31..0]63..56      <- VR[vt]127..120
mem[addr31..0]55..48      <- VR[vt]111..104
mem[addr31..0]47..40      <- VR[vt]95..88
mem[addr31..0]39..32      <- VR[vt]79..72
mem[addr31..0]31..24      <- VR[vt]63..56
mem[addr31..0]23..16      <- VR[vt]47..40
mem[addr31..0]15..8       <- VR[vt]31..24
mem[addr31..0]7..0        <- VR[vt]15..8
```

Store Pack Unsigned From Vector unit (SUV). Format SUV vt[element], offset(base). Bits 14:7 from each halfword of vector register vt are simultaneously stored into eight consecutive bytes starting at the effective address, addr. In operation this instruction performs where data moves are performed simultaneously:

```
addr31..0 <- SR[base] + (offset*8)
mem[addr31..0]63..56      <- VR[vt]126..119
mem[addr31..0]55..48      <- VR[vt]110..103
mem[addr31..0]47..40      <- VR[vt]94..87
mem[addr31..0]39..32      <- VR[vt]78..71
mem[addr31..0]31..24      <- VR[vt]62..55
mem[addr31..0]23..16      <- VR[vt]46..39
mem[addr31..0]15..8       <- VR[vt]30..23
mem[addr31..0]7..0        <- VR[vt]14..7
```

Store Sign Extended Byte From Vector unit (SXV). Format SXV vt[element], offset(base). The least significant bytes of each halfword of vector register vt are stored into eight consecutive bytes starting at the effective address, addr and sign extended. In operation this instruction performs where data moves are performed simultaneously:

```
addr31..0 <- SR[base] + (offset*8)
mem[addr31..0]63..56      <- VR[vt]119..112
mem[addr31..0]55..48      <- VR[vt]103..96
mem[addr31..0]47..40      <- VR[vt]87..80
mem[addr31..0]39..32      <- VR[vt]71..64
mem[addr31..0]31..24      <- VR[vt]55..48
mem[addr31..0]23..16      <- VR[vt]39..32
mem[addr31..0]15..8       <- YR[vt]23..16
mem[addr31..0]7..0        <- VR[vt]7..0
```

Store Zero Extended Byte From Vector unit (SZV). Format SZV vt[element], offset(base). The least significant bytes of each halfword of vector register vt are stored into eight consecutive bytes starting at the effective address, addr and zero extended. In operation this instruction performs where data moves are performed simultaneously:

```
addr31..0 <- SR[base] + (offset*8)
mem[addr31..0]63..56      <- VR[vt]119..112
mem[addr31..0]55..48      <- VR[vt]103..96
mem[addr31..0]47..40      <- VR[vt]87..80
mem[addr31..0]39..32      <- VR[vt]71..64
mem[addr31..0]31..24      <- VR[vt]55..48
mem[addr31..0]23..16      <- VR[vt]39..32
mem[addr31..0]15..8       <- VR[vt]23..16
mem[addr31..0]7..0        <- VR[vt]7..0
```

Store Alternate Bytes from Vector Unit (SHV). Format SHV vt[element], offset(base). Bits 14:7 from each slice of vector register vt are stored into eight alternating bytes in memory, starting at the effective address, addr. In operation this instruction performs moves of a given condition are performed simultaneously:

```
addr31..0 <- SR[base] + (offset*16)
if (addr0 =0) then
    mem[addr31..0]127..122      <-- [vt]127..120
    mem[addr31..0]111..96       <-- [vt]111..104
    mem[addr31..0]95..80        <-- [vt]95..88
    mem[addr31..0]79..64        <-- [vt]79..72
    mem[addr31..0]63..48        <-- [vt]63..56
    mem[addr31..0]47..32        <-- [vt]47..40
    mem[addr31..0]31..16        <-- [vt]31..24
    mem[addr31..0]15..0         <-- [vt]15..8
else
    mem[addr31..0]119..112      <-- [vt]119..112
    mem[addr31..0]103..96       <-- [vt]103..96
    mem[addr31..0]87..80        <-- [vt]87..80
    mem[addr31..0]71..64        <-- [vt]71..64
    mem[addr31..0]55..48        <-- [vt]55..48
    mem[addr31..0]39..32        <-- [vt]39..32
    mem[addr31..0]23..16        <-- [vt]23..16
    mem[addr31..0]7..0          <-- [vt]7..0
```

Store Alternate Fourths from Vector Unit (SFV). Format SFV vt[element], offset(base).

Bits 14:7 from each of either the four high order, or the four low order, slices of vector register, vt, as specified by element, are stored into memory at every fourth bytes, starting at the effective address in memory, addr. In operation this instruction performs moves of a given condition are performed simultaneously:

```
addr31..0 <- SR[base] + (offset*16)
e <- element
b <- addr1..addr0
if (b=3) then
    mem[addr31..0]103..96       --> VR[vt]8*e+62..8*e+55
    mem[addr31..0]71..64        --> VR[vt]8*e+46..8*e+39
    mem[addr31..0]39..32        --> VR[vt]8*e+30..8*e+23
    mem[addr31..0]7..0          --> VR[vt]8*e+14..8*e+7
else if (b=2) then
    mem[addr31..0]111..104      --> VR[vt]8*e+62..8*e+55
    mem[addr31..0]79..72        --> VR[vt]8*e+46..8*e+39
    mem[addr31..0]47..40        --> VR[vt]8*e+30..8*e+23
    mem[addr31..0]15..8         --> VR[vt]8*e+14..8*e+7
else if (b=1) then
    mem[addr31..0]119..112      --> VR[vt]8*e+62..8*e+55
    mem[addr31..0]87..80        --> VR[vt]8*e+46..8*e+39
    mem[addr31..0]55..48        --> VR[vt]8*e+30..8*e+23
    mem[addr31..0]23..16        --> VR[vt]8*e+14..8*e+7
else if (b=0) then
    mem[addr31..0]127..120      --> VR[vt]8*e+62..8*e+55
    mem[addr31..0]95..88        --> VR[vt]8*e+46..8*e+39
    mem[addr31..0]63..56        --> VR[vt]8*e+30..8*e+23
    mem[addr31..0]31..24        --> VR[vt]8*e+14..8*e+7
```

Store Alternate Shortwords from Vector Unit (SAV). Format SAV vt[element], offset(base). Four halfwords from either the four high order, or the four low order, slices of vector register vt, as specified by element, are stored into four alternating halfwords in memory, starting at the effective address, addr. In operation this instruction performs moves of a given condition are performed simultaneously:

```
addr31..0 <- SR[base] + (offset *8)
b <- addr1..addr0
e <- element
if (b=2) then
    mem[addr31..0]111..96       <- VR[vt]8*e+63..8*e+48
    mem[addr31..0]79..64        <- VR[vt]8*e+47..8*e+32
    mem[addr31..0]47..32        <- VR[vt]8*e+31..8*e+16
    mem[addr31..0]15..0         <- VR[vt]8*e+15..8*e
if (b=0) then
    mem[addr31..0]127..112      <- VR[vt]8*e+63..8*e+48
    mem[addr31..0]95..80        <- VR[vt]8*e+47..8*e+32
    mem[addr31..0]63..48        <- VR[vt]8*e+31..8*e+16
    mem[addr31..0]31..16        <- VR[vt]8*e+15..8*e
```

GROUP V LOADS. TRANSPOSE INSTRUCTIONS

FIG. 6A illustrates an N×N data structure ("matrix") 410 where n=4. The matrix 410 is stored in memory 102 and each cell (e.g., 411) with matrix 410 contains a certain number of bits, e.g., 16 bits. During a transpose operation, the arrangement of rows is transposed into an arrangement of columns. For instance, the data of matrix 410 are transposed into matrix 412 of FIG. 6B. As shown, the rows: abcd, efgh, ijkl, mnop of matrix 410 are transposed as columns in matrix 412. Resulting matrix 412 contains rows aeim, bfjn, cgko, and dhlp. In computer controlled graphics applications, certain hardware graphics processors can be specially adapted for processing rows or columns of matrix data but not usually both. Therefore, the present invention provides several mechanisms for taking an initial matrix and transposing that matrix into a data format adapted for a particular graphics processor. In one embodiment, an instruction format exists for taking an N×N matrix in memory 102, storing it into the register file 204 and another instruction format exists for then storing the matrix back into memory 102 in a transposed format. This takes 2N cycles for the total transposition. In another embodiment, an instruction format exists for taking an N×N matrix in from the register file 204, storing it into the memory 102 and another instruction format exists for then storing the matrix back into register file 204 in a transposed format. This takes 2N cycles for the total transposition.

Load Transposed to Vector Unit (LTV). According to this instruction of the present invention, the contents of the scalar register base are added to the offset (for this instruction, offset is defined to be increments of quad words) to form the effective byte address, addr, in memory 102. The eight halfwords starting at the effective address, addr, in memory 102 are loaded into eight different slices or "locations" of consecutive vector registers, starting with the vector register specified by vt. The actual register number for each slice is a function of physical slice number and element. For each slice, the vector register number is computed by the procedure: VT(s)=vt(4:3) 11 (slice+element/2)mod8. In one implementation vt is a five bit value, therefore (4:3) represents the two most significant bits of vt. The bits of the vector register, vt, that are written are a function of the physical slice. Bits that are in a slice in memory 102 end up in the same slice in the vector register file. In one embodiment, vt is restricted to values of 0, 8, 16; or 24. Slice can be from 0 to 7. In one embodiment, element is restricted to values of 0, 2, 4, 6,8, 10, 12 or 14. The effective address, addr, is typically quad word aligned. LTV contains the following exemplary format: LTV vt[element], offset(base). In operation, the LTV instruction is executed according to the following procedure:

```
Addr31..0 <- SR[base] +(offset *16)
e <- element(3:1) "e = e/2"
s <- slice
For each slice s=0 to 7 do
    vt[s] = vt(4:3) || (s+e)mod8
    VR[vt[s]]16*s+15..16*s <- mem[addr31..0]16*s+15..16*s
```

Although shown as a loop of s from 0 to 7, all of the eight s loops are performed simultaneously according to the present invention.

Figure 6C:
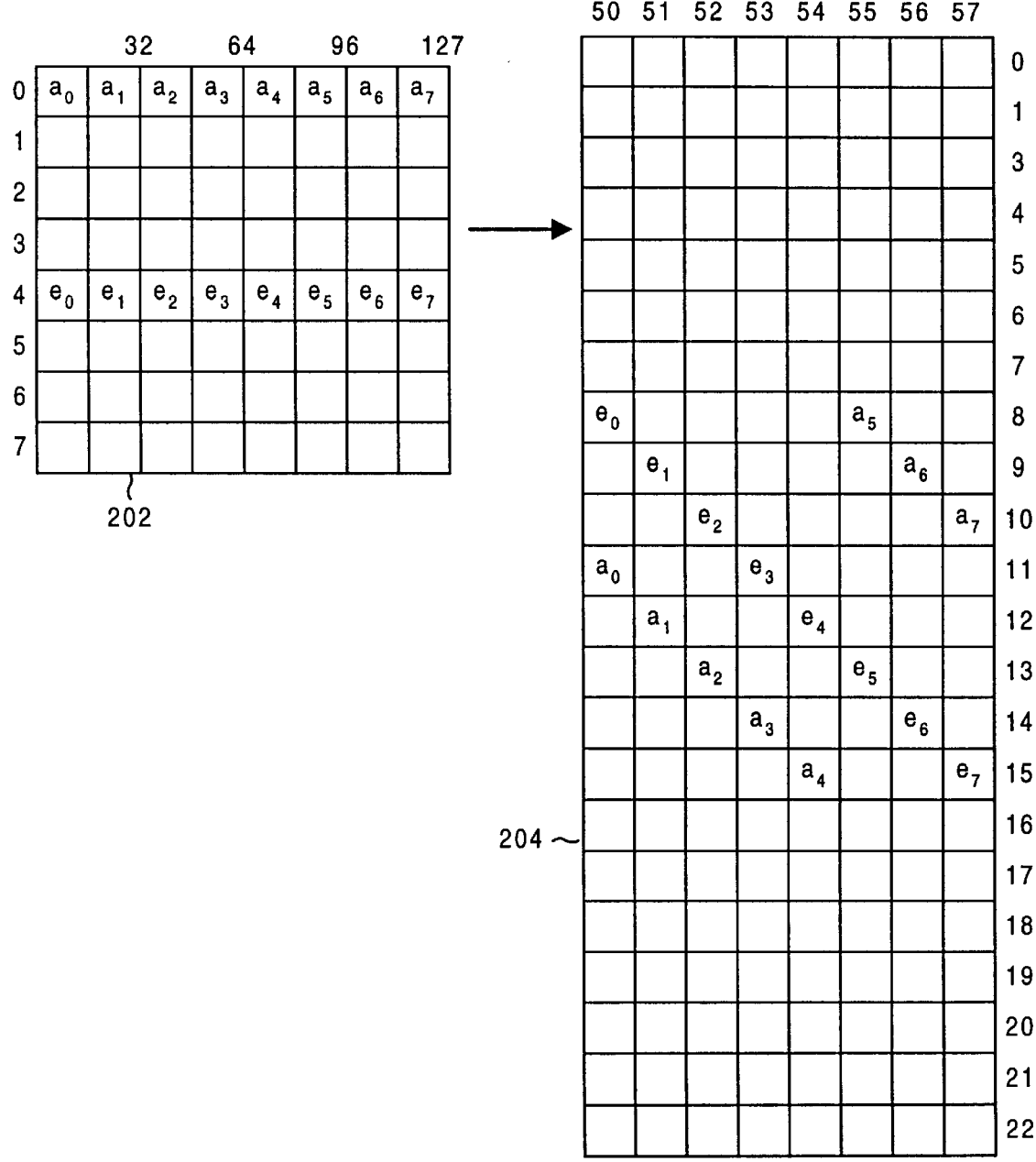
FIG. 6C illustrates an exemplary LTV transpose instruction of the present invention.

FIG. 6C illustrates an exemplary operation of the LTV instruction for two different quad words (0) and (4) stored in an 8×8 matrix 202 of memory 102. Matrix 202 contains 16-bit individual entries. The following instructions (where $1 is the base address of matrix 202) are executed:

LTV $v8[6], 0($1)
  LTV $v8[0], 4($1)

As shown in FIG. 7A, the first instruction simultaneously moves the eight 16-bit values, a0–a7, from row zero of matrix 202 into eight different registers of register file 204 as shown. In this instruction example e=6. The data is moved into eight different slices of eight different registers to form a "diagonal" within the register file 204 starting with vector register 11. The slices are updated on each 16-bit data movement. Similarly, the second instruction simultaneously moves the eight 16-bit values, e0–e7, from row four of matrix 202 into the registers of register file 204 as shown. In this instruction example e=0. It is appreciated that the data is transferred between the crossbar circuit 130 and the eight 16-bit data values of a given LTV instruction can be transferred simultaneously.

Load Transposed Wrapped to Vector Unit (LTWV). According to the LTWV instruction of the present invention, the contents of the scalar register base are added to the offset (for this instruction, offset is defined to be increments of quad words) to form an effective byte address, addr, in memory 102. The eight halfwords starting at the effective address in memory 102 are loaded into different locations of eight consecutive vector registers, starting with the vector register specified by vt. The actual register number for each slice is a function of physical slice number and element. The bits of vt that are written are also a function of the physical slice number and element. In this usage, the element field acts as a left shift of the data in memory 102 by that number of elements. For each slice, the vector register number is computed by the procedure: VT(s)=vt(4:3) 11 (slice). Vt is restricted to values of 0, 8, 16, or 24. Slice can be from 0 to 7. Element is restricted to values of 0, 2, 4, 6, 8, 10, 12, or 14. The effective address in memory is quad word aligned. LTWV contains the following exemplary format: LTWV vt[element], offset(base). In operation, the LTWV instruction is executed according to the following procedure:

```
Addr31..0 <- SR[base] +(offset *16)
e <- element(3:1) "e = e/2"
s <- slice
For each slice s=0 to 7 do
VR[s]16*s+15..16*s <- mem[addr31..0](16*(s+e)+15)mod128..(16*(s+e))mod128
```

Although shown as a loop of s from 0 to 7, all of the eight s loops are performed simultaneously within a single cycle in accordance with the present invention.

FIG. 6D and FIG. 7A illustrates an exemplary operation of the LTWV instruction for one quad word stored in an 8×8 matrix 401 of memory 102. Matrix 401 contains 64 16-bit entries (numbered 0 to 3f hex). The following instruction (where $1 is the base address of matrix 202) is executed:

LTWV $v8[0], 0($1)

As shown in FIG. 7A, this first instruction simultaneously moves the eight 16-bit values from entries 0 to 7, from row zero of matrix 401 into slices (s0 to s7) of 8 consecutive registers of register file 204 starting with vector register 8 and ending with vector register 15. In this instruction example e=0. Each of the 64 entries of FIG. 7A represents a vector register slice and the entries are numbered 0 to 3f hex. The entries: 0, 9, 12, 1b, 24, 2d 36, and 3f receive the data and these entries correspond, respectively, to vector 8 (slice 0), vector 9 (slice 1), vector 10 (slice 2), vector 11 (slice 3), vector 12 (slice 4), vector 13 (slice 5), vector 14 (slice 6), and vector 15 (slice 7). It is appreciated that the data is transferred between the crossbar circuit 130 and eight 16-bit data values can be transferred simultaneously.

Store Transposed From Vector Unit (STV). In the STV instruction, the contents of the scalar register base are added to the offset (for this instruction, offset is defined to be increments of quad words) to form the effective byte address, addr, in memory 102. Single elements from eight consecutive vector registers (of register file 204), starting with the vector register vt, are stored into eight halfwords in memory 102 starting at the effective address. The actual register number for each slice is a function of physical slice number and element. For each slice, the vector register number is computed by the procedure,. VT(s)=vt(4:3) || (slice+element/2)mod8.

The bits of vt that are read from, are a function of the physical slice. Bits that are in a slice in the vector register file end up in the same slice in memory 102. VT is restricted to values of 0, 8, 16, 24, or 32. Slice can be from 0 to 7. Element is restricted to values of 0, 2, 4, 6, 8, 10, 12, or 14. The effective address in memory is quad word aligned. All of the eight elements transferred from the register file 204 to the memory 102 are transferred simultaneously. STV contains the following exemplary format: STV vt[element], offset(base). In operation, the STV instruction is executed according to the following procedure:

```
Addr31..0 <- SR[base] +(offset *16)
e <- element(3:1) "e = e/2"
s <- slice
For each slice s=0 to 7 do
    vt[s] = vt(4:3) || (s+e)mod8
    mem[addr31..0]16*s+15..16*s <- VR[vt[s]]16*s+15..16*s
```

Although shown as a loop of s from 0 to 7, all of the eight s loops are performed simultaneously within the present invention.

Store Transposed Wrapped From Vector Unit (SWV). In the SWV instruction, the contents of the scalar register base are added to the offset (for this instruction, offset is defined to be increments of quad words) to form the effective byte address, addr, in memory 102. Single elements from eight consecutive vector registers (of register file 204), starting with the vector register vt, are stored into eight halfwords in memory 102 starting at the effective address. The actual register number for each slice is a function of physical slice number and element. The bits of vt that are read from, are a function of the physical slice number and element. In this usage, the element field acts as a left shift of the data in memory 102 by that number of elements. VT is restricted to values of 0, 8, 16, 24, or 32. Slice can be from 0 to 7. Element is restricted to values of 0, 2, 4, 6, 8, 10, 12, or 14. The effective address in memory 102 is quad word aligned. All of the eight elements transferred from the register file 204 to the memory 102 are transferred simultaneously. SWV contains the following exemplary format: SWV vt[element], offset(base). In operation, the SWV instruction is executed according to the following procedure:

```
Addr31..0 <- SR[base] +(offset *16)
e <- element(3:1) "e = e/2"
s <- slice
```

-continued

```
For each slice s=0 to 7 do
vt[s] = vt(4:3) || (s+e)mod8
mem[addr31..0](16*(s+e)+15)mod128..(16*(s+e))mod128 <- VR[vt]16*s+
15..16*s
```

Although shown as a loop of s from 0 to 7, all of the eight s cycles are performed simultaneously within the present invention.

The following example illustrates a transposition of an 8×8 matrix 401 of 64 16-bit data values as shown in FIG. 6D. The resultant transposed matrix 401' is shown in FIG. 8H. Matrix 401 is stored in memory 102 and comprises eight quad words, or rows, numbered 8000 to 8070. Row 8000 contains data 0000, 0010, 0020, 0030, 0040, 0050, 0060, and 0070, etc.

The following illustrates a transposition of matrix 401 where $1 is the base address (8000) of the matrix 401 in memory 102 and the offsets are quad word offsets from this base. In this transposition, data is initially read from memory 102, stored in register file 204 as an intermediate matrix, and then transferred back to memory 102, transposed.

```
ltwv   $v8[0], 0[$1]
ltwv   $v8[14], 1[$1]
ltwv   $v8[12], 2[$1]
ltwv   $v8[10], 3[$1]
ltwv   $v8[8], 4[$1]
ltwv   $v8[6], 5[$1]
ltwv   $v8[4], 6[$1]
ltwv   $v8[2], 7[$1]
swv    $v8[0], 0[$1]
swv    $v9[2], 1[$1]
swv    $v10[4], 2[$1]
swv    $v11[6], 3[$1]
swv    $v12[8], 4[$1]
swv    $v13[10], 5[$1]
swv    $v14[12], 6[$1]
swv    $v15[14], 7[$1]
```

The above eight LTWV instructions load the 64 16-bit data values into the registers VR(8) to VR(15) of register file 204 over eight clock cycles. Each instruction loads eight 16-bit values through the crossbar circuit 103 into register file 204 and consumes only one clock cycle to complete. FIGS. 7A through 7H illustrate the contents of the vector registers 8 through 15 of 5 register file 204 at the completion of each of the above eight LTWV instructions, respectively.

The first LTWV instructions reads row 8000 of matrix 401 (FIG. 6D), the second instruction reads row 8010, the third instruction reads row 8020, . . . , the eighth instruction reads row 8070. The eight underlined entries of the vector register file 204 of FIG. 7A through FIG. 7H illustrate the eight data slices that are written to the register file 204 as a result of execution of each LTWV instruction. FIG. 7H illustrates the complete contents of registers VR(8) through VR(15) at the completion of the above eight LTWV instructions. The completion of these eight LTWV instructions create an intermediate matrix shown in FIG. 7H.

The above eight SWV instructions transfer the data from vector registers VR(8) to VR(15) back to memory unit 102 in such a way that a transposition of the original matrix 401 is performed. These eight SWV instructions consume a total of eight clock cycles, one cycle each instruction. In generate, each SWV instruction reads a register of register file 204, left shifts the data, and stores the data into a row of memory 102.

FIG. 8A through FIG. 8H illustrate the contents of 8×8 matrix 401' stored in memory 102 at the completion of each of the above eight SWV instructions, respectively. The first SWV instruction, reads the eight pieces of data: 0000, 1000, 2000, 3000, 4000, 5000, 6000, and 7000 from vector register VR(8) of register file 204 (see FIG. 7H for its position) and stores this data within the first row 8000 of matrix 401' as shown by FIG. 8A. The second SWV instruction reads the eight pieces of data 0010, 1010, 2010, 3010, 4010, 5010, 6010, and 7010 from vector register VR(9) of register file 204 (FIG. 7H) shifts the data appropriately and stores it into row 8010 of matrix 401' as shown by FIG. 8B. The third SWV instruction reads the eight pieces of data 0020, 1020, 2020, 3020, 4020, 5020, 6020, and 7020 from vector register VR(10) of register file 204 (FIG. 7H) shifts the data appropriately and stores it into row 8020 of matrix 401' as shown by FIG. 8C, etc. The last SWV instruction reads the eight data pieces 0070, 1070, 2070, 3070, 4070, 5070, 6070, and 7070 from vector register VR(15) of register file 204 (FIG. 7H) shifts the data appropriately and stores it into row 8070 of matrix 401' as shown by FIG. 8H. These eight SWV instructions complete the transposition of matrix 401 of FIG. 6D to matrix 401' of FIG. 8H in accordance with the present invention. The eight LTWV instructions and the eight SWV instructions take a total of 16 cycles to complete the transposition of the 8×8 matrix according to the present invention.

The following sequence of instructions is used to transpose an 8×8 matrix of 64 16-bit data stored within eight vector registers of register file 204 (FIG. 9B) by storing the data into memory 102 and then loading the data back into the register file 204. As above, the transposition is performed in 16 clock cycles. FIG. 9B illustrates the original contents of the 8×8 matrix and FIG. 11H illustrates the resulting transposed matrix. FIG. 9A illustrates the cleared contents of matrix 403 of memory 102 before the following instructions are executed:

```
stv    $v0[0], 8[$1]
stv    $v0[2], 9[$1]
stv    $v0[4], 10[$1]
stv    $v0[6], 11[$1]
stv    $v00[8], 12[$1]
stv    $v0[10], 13[$1]
stv    $v0[12], 14[$1]
stv    $v0[14], 15[$1]
ltwv   $v0[0], 8[$1]
ltwv   $v0[14], 9[$1]
ltwv   $v0[12], 10[$1]
ltwv   $v0[10], 11[$1]
ltwv   $v0[8], 12[$1]
ltwv   $v0[6], 13[$1]
ltwv   $v0[4], 14[$1]
ltwv   $v0[2], 15[$1]
```

FIG. 10A through FIG. 10H illustrate the contents of matrix 403 upon each execution of the above eight STV instructions, respectively. The first STV instruction reads the diagonal eight pieces of data: 0000, 1010, 2020, 3030, 4040, 5050, 6060, and 7070 from vector registers VR(0) to VR(7) of register file 204 (FIG. 9B) and stores them into row 8080 of matrix 403 as shown by FIG. 10A. The second STV instruction reads the diagonal eight pieces of data: 1000, 2010, 3020, 4030, 5040, 6050, 7060, and 0070 from vector registers VR(0) to VR(7) of register file 204 (FIG. 9B) and stores them into row 8090 of matrix 403 as shown by FIG. 10B. The third STV instruction reads the diagonal eight pieces of data: 2000, 3010, 4020, 5030, 6040, 7050, 0060, and 1070 from vector registers VR(0) to VR(7) of register file 204 (FIG. 9B) and stores them into row 80a0 of matrix 403 as shown by FIG. 10C. The last STV instruction reads the diagonal eight pieces of data: 7000, 0010, 1020, 2030, 3040, 4050, 5060, and 6070 from vector registers VR(0) to VR(7) of register file 204 (FIG. 9B) and stores them into row 80f0 of matrix 403 as shown by FIG. 10H. The above eight STV instructions take a total of eight cycles to complete matrix 403 (FIG. 10H).

FIG. 11A through FIG. 11H illustrate the result of vector registers VR(0) through VR(7) of register file 204 upon each execution of the above eight LTWV instructions, respectively. The first LTWV instruction reads row 8080 of matrix 403 (FIG. 10H) and loads these eight pieces of data into the diagonal slices of register file 204: 0, 9, 12, 1b, 24, 2d, 36, and 3f as shown in FIG. 11A. The second LTWV instruction reads row 8090 of matrix 403 (FIG. 10H) and loads these eight pieces of data into the diagonal slices of register file 204: 1, a, 13, 1c, 25, 2e, 37, and 38 as shown in FIG. 11B. The third LTWV instruction reads row 80a0 of matrix 403 (FIG. 10H) and loads these eight pieces of data into the diagonal slices of register file 204: 2, b, 14, 1d, 26, 2f, 30, and 39 as shown in FIG. 11C. The last LTWV instruction reads row 80f0 of matrix 403 (FIG. 10H) and loads these eight pieces of data into the diagonal slices of register file 204: 8, 11, 1a, 23, 2c, 35, 3e, and 7 as shown in FIG. 11H. The above eight LTWV consume eight clock cycles. FIG. 11H illustrate a transposition of the matrix of FIG. 9B. According to the present invention, the transposition consumes 16 clock cycles for an 8×8 matrix.

The preferred embodiment of the present invention, methods for moving data within a system having a processor, a vector register file, and a memory unit, are thus described. While the present invention has been described in particular embodiments, it should be appreciated that the present invention should not be construed as limited by such embodiments, but rather construed according to the below claims.

What is claimed is:

1. In a computer controlled graphics system, a method of loading a 128 bit data segment into a register file, said register file comprising individual registers of 128 bits each, said method comprising the steps of:

a) processing a first instruction by accessing a first portion of said data segment from a memory unit and storing said first portion into a register of said register file, said memory unit containing 128-bit data boundaries for alignment; and b) processing a second instruction by accessing a second portion of said data segment from said memory unit and storing said second portion into said register of said register file, wherein said data segment is byte aligned within said memory unit and spans a 128-bit boundary of said memory unit and wherein further said step a) and said step b) consume two clock cycles of said computer controlled graphics system.

2. A method as described in claim 1 wherein said first portion and said second portion are stored in discontiguous memory locations in different memory tiles of said memory unit.

3. A method as described in claim 2 wherein said data segment represents graphics information for display on a display screen of said computer controlled graphics system.

4. In a computer controlled graphics system, a method of loading a data segment into a register file, said register file comprising a plurality of registers with individual registers being 128 bits wide, said method comprising the steps of:

a) processing a single load instruction containing an initial memory location, said single load instruction performing the steps of:

a1) identifying said initial memory location within a memory unit of said computer controlled graphics system;

a2) simultaneously accessing eight consecutive bytes of said data segment starting at said memory location; and a3) simultaneously loading said eight consecutive bytes into consecutive locations of a same register of said register file, wherein said consecutive locations of said register are each 16-bits wide.

5. A method as described in claim 4 wherein said step a3) further comprises the steps of:

for each of said eight consecutive bytes:
loading a byte from said data segment into eight most significant bits of a 16-bit register location of said consecutive locations of said same register; and
zeroing eight least significant bits of said 16-bit register location.

6. A method as described in claim 4 wherein said step a3) further comprises the steps of:

for each of said eight consecutive bytes:
loading a zero into the most significant bit of a 16-bit register location of said consecutive locations of said same register;
loading a byte from said data segment into the next eight most significant bits of said 16-bit register location; and
zeroing seven least significant bits of said 16-bit register location.

7. A method as described in claim 4 wherein said step a3) further comprises the steps of:

for each of said eight consecutive bytes:
replicating eight times the most significant bit of a byte from said data segment to arrive at eight replicated bits;
loading said eight replicated bits into eight most significant bits of a 16-bit register location of said consecutive locations of said same register; and
loading a byte from said data segment into eight least significant bits of said 16-bit register location.

8. A method as described in claim 4 wherein said step a3) further comprises the steps of:

for each of said eight consecutive bytes:
loading eight zeros into eight most significant bits of a 16-bit register location of said consecutive locations of said same register; and
loading a byte from said data segment into eight least significant bits of said 16-bit register location.

9. In a computer controlled graphics system, a method of loading a data segment into a register file, said register file comprising a plurality of registers with individual registers being 128 bits wide, said method comprising the steps of:

a) processing a single load instruction containing an initial memory location, said single load instruction performing the steps of:

a1) identifying said initial memory location within a memory unit of said computer controlled graphics system;

a2) simultaneously accessing eight alternate bytes of said data segment starting at said memory location with a byte offset value; and a3) simultaneously loading said eight alternate bytes into consecutive locations of a same register of said register file;

wherein said consecutive locations of said same register are each 16-bits wide and wherein steps a2) and a3) occur within a single clock cycle.

10. A method as described in claim 9 wherein said byte offset value is zero.

11. A method as described in claim 9 wherein said byte offset value is one.

12. A method as described in claim 9 wherein said step a3) further comprises the steps of:
for each of said eight alternate bytes:
loading a zero into the most significant bit of a 16-bit register location of said consecutive locations of said same register;
loading a byte from said data segment into the next eight most significant bits of said 16-bit register location; and
zeroing seven least significant bits of said 16-bit register location.

13. A method as described in claim 9 wherein said step a3) further comprises the steps of:
for each of said eight alternate bytes:
replicating eight times the most significant bit of said byte from said data segment to arrive at eight replicated bits;
loading said eight replicated bits into eight most significant bits of a 16-bit register location of said consecutive locations of said same register; and
loading a byte from said data segment into eight least significant bits of said 16-bit register location.

14. A method as described in claim 9 wherein said step a3) further comprises the steps of:
for each of said eight alternate bytes:
loading eight zeros into eight most significant bits of a 16-bit register location of said consecutive locations of said same register; and
loading a byte from said data segment into eight least significant bits of said 16-bit register location.

15. In a computer controlled graphics system, a method of loading a data segment into a register file, said register file comprising a plurality of registers with individual registers being 128 bits wide, said method comprising the steps of:
a) processing a single load instruction containing an initial memory location, said single load instruction performing the steps of:
a1) identifying said initial memory location within a memory unit of said computer controlled graphics system;
a2) simultaneously accessing every fourth byte of said data segment starting at said memory location with a byte offset value; and
a3) simultaneously loading said every fourth byte of step a2) into four consecutive locations of a same register of said register file;
wherein said four consecutive locations of said register are each 16-bits wide and wherein steps a2) and a3) occur within a single clock cycle.

16. A method as described in claim 15 wherein said byte offset value is one value of a set of values comprising 0, 1, 2, and 3 and wherein said data segment is 128-bits wide.

17. A method as described in claim 16 wherein said step a3) further comprises the steps of:
for each of said every fourth byte:
loading a zero into the most significant bit of a 16-bit register location of said consecutive locations of said same register;
loading a byte from said data segment into the next eight most significant bits of said 16-bit register location; and
zeroing seven least significant bits of said 16-bit register location.

18. A method as described in claim 16 wherein said step a3) further comprises the steps of:
for each of said every fourth byte:
replicating eight times the most significant bit of said byte from said data segment to arrive at eight replicated bits;
loading said eight replicated bits into eight most significant bits of a 16-bit register location of said consecutive locations of said same register; and
loading a byte from said data segment into eight least significant bits of said 16-bit register location.

19. A method as described in claim 16 wherein said step a3) further comprises the steps of:
for each of said every fourth byte:
loading eight zeros into eight most significant bits of a 16-bit register location of said consecutive locations of said same register; and
loading a byte from said data segment into eight least significant bits of said 16-bit register location.

20. In a computer controlled graphics system, a method of loading a data segment into a register file, said register file comprising a plurality of registers with individual registers being 128 bits wide, said method comprising the steps of:
a) processing a single load instruction containing an initial memory location, said single load instruction performing the steps of:
a1) identifying said initial memory location within a memory unit of said computer controlled graphics system;
a2) simultaneously accessing four 16-bit shortwords of said data segment starting at said memory location with a byte offset value; and
a3) simultaneously loading said four 16-bit shortwords into four consecutive locations of a same register of said register file;
wherein said consecutive locations of said same register are each 16-bits wide and wherein steps a2) and a3) occur within a single clock cycle.

21. A method as described in claim 20 wherein step a3) comprises the step of loading said four 16-bit shortwords into four consecutive locations being the first four 16-bit locations of said same register of said register file.

22. A method as described in claim 20 wherein step a3) comprises the step of loading said four 16-bit shortwords into four different consecutive locations being the last four 16-bit locations of said same register of said register file.

23. In a computer controlled graphics system including a processor, a memory unit, and a register file of said processor, a method of transposing data of an original matrix stored in said memory unit, said original matrix comprising N rows and N columns of y-bit data portions, said method comprising the steps of:
a) executing a single load instruction to simultaneously access N data portions of a row of said original matrix from said memory unit and to simultaneously load said N data portions of said row into respective y-bit locations of N consecutive registers of said register file commencing at an initial register;
b) executing said step a) N times with N different initial registers, one execution for each row of said N rows of said original matrix, said step b) producing an intermediate matrix stored in said register file;
c) executing a single store instruction to perform a left shift of N y-bit locations of a register of said register file to arrive at N left shifted y-bit values and to simultaneously load said N left shifted y-bit values into a row of memory unit; and d) executing said step c) for each of said N registers used by step b) wherein a different left shift amount is performed and a different row of said memory unit is used for each execution, said step d) producing a transposed matrix of N rows stored within said memory unit, said transposed matrix being a transposition of said original matrix.

24. A method as described in claim 23 where N=8, y=16, and wherein said original matrix and said transposed matrix each comprises graphics information for display on a display screen of said computer controlled graphics system.

25. In a computer controlled graphics system including a processor, a memory unit, and a register file of said processor, a method of transposing data of an original matrix stored in said register file, said original matrix comprising N rows and N columns of y-bit data portions, said method comprising the steps of:

a) executing a single store instruction to simultaneously access N data portions of N different y-bit locations of N different registers of said register file, commencing at an initial register, and to simultaneously store said N data portions into N consecutive y-bit locations of a row of memory of said memory unit;

b) executing said step a) N times with N different initial registers, said step b) producing an intermediate N by N matrix in said memory unit with each execution of step a) filling a different row of said intermediate matrix;

c) executing a single load instruction to simultaneously access N data portions of a row from said intermediate matrix of said memory unit and to simultaneously load said N data portions of said row into respective y-bit locations of N consecutive registers of said register file commencing at an initial register; and d) executing said step c) for each row of said intermediate matrix, said step d) producing a transposed matrix stored within said register file, said transposed matrix being a transposition of said original matrix.

26. A method as described in claim 26 where N=8, y=16, and wherein said original matrix and said transposed matrix each comprises graphics information for display on a display screen of said computer controlled graphics system.

* * * * *